United States Patent [19]
Houlberg

[11] Patent Number: 5,465,274
[45] Date of Patent: Nov. 7, 1995

[54] DIGITAL CIRCUIT FOR DECODING ENCODED DOPPLER DATA

[75] Inventor: Christian L. Houlberg, Ventura, Calif.

[73] Assignee: The United States of America as represented by the Secretary of the Navy, Washington, D.C.

[21] Appl. No.: 418,968

[22] Filed: Apr. 7, 1995

[51] Int. Cl.⁶ .................................................. H04L 27/00
[52] U.S. Cl. ........................ 375/340; 375/371; 342/202; 342/402; 342/418
[58] Field of Search ........................ 375/340, 241, 375/242, 254, 353, 371; 342/201, 202, 402, 405, 418

[56] References Cited

U.S. PATENT DOCUMENTS 4,187,491  2/1980  Lindstrum et al. .................. 342/418 X
4,764,942  8/1988  Shigaki et al. ........................... 375/372

*Primary Examiner*—Stephen Chin
*Assistant Examiner*—Kevin Kim
*Attorney, Agent, or Firm*—David S. Kalmbaugh; Melvin J. Sliwka

[57] ABSTRACT

An electronics circuit receives a sub frame of encoded doppler data having Groups One through N of data words with the first three words of Group N comprising a frame sync signal which is compared to a reference signal with a sync pulse being generated whenever the signals are identical. This sync pulse is supplied to three counters to load each counter with a predetermined count. The first counter counts the number of words in each Group; the second counter counts the number of Groups in a sub frame and the third counter indicates the location of Automatic Gain Control and Word Width data within the sub frame. Encoded within each group of a Sub Frame are one or more clusters of doppler words with a fourth counter indicating the location of these clusters of doppler words. A word decoder circuit in response to a gain signal and a word width data signal decodes each word of each group of the sub frame having doppler data to extract the doppler data.

17 Claims, 14 Drawing Sheets

DIGITAL CIRCUIT FOR DECODING ENCODED DOPPLER DATA

BACKGROUND OF THE INVENTION

1. Field of the Invention

The present invention relates generally to the decoding of digital data. More specifically, the present invention relates to a digital circuit for decoding encoded doppler data received from a missile in flight or the like.

2. Description of the Prior Art

The pulse code modulation (PCM) or digital processing of analog data signals in the low to high frequency range is also becoming highly useful for analyzing the performance of weapons systems such as guided missiles. For example, the analog data acquired by a guided missile during flight is converted to its digital equivalent and then placed in a digital PCM frame for transmission to a ground station, a ship or an aircraft for analysis.

There are, however, some problems left unsolved in the art of digital processing of analog signals provided by a missile in flight. For, example, there is a limitation in bandwidth at which the digitized information may be transmitted from the missile to the ground station because of National Telecommunications and Information Administration frequency allocation limitations. In addition, a ground station's data receiving and processing capabilities need to be considered when transmitting pulse code modulated (PCM) flight data from a missile in flight to a ground station.

In certain applications, such as data received from a missile during flight, there is a need to increase the resolution of the equivalent digital signal provided by the missile's telemetry system. This necessitates the use of, for example, fourteen bit equivalent digital words to represent the incoming analog signal. This increase in the number of bits to represent the incoming analog signal results in a significant decrease in the error being introduced in the higher resolution bits (least significant bits) and a significant increase in the bandwidth required for transmission of the digital equivalent signal provided by the missile's telemetry system. By utilizing a form of automatic gain control (AGC) after the incoming analog signal is converted to its digital fourteen bit equivalent, a subset, for example, of four of the fourteen bits which is encoded doppler data may be transmitted with a significant increase in the accuracy and resolution of the transmitted digital information within a reduced bandwidth.

When, the encoded doppler data is received by a ground station there is a need to decode this doppler data to extract information contained in the data for the purpose of analyzing the missile's flight performance.

SUMMARY OF THE INVENTION

The present invention comprises an electronics circuit for decoding encoded doppler data received from, for example, a missile in flight to extract from the received encoded doppler data information contained in the data to allow for an analysis of the missile's flight performance.

Encoded doppler data is provided to the electronics circuit in a Sub Frame having Groups One through N with each having n eight bit words per group, wherein N and n are integers. The first three eight bit words of Group N comprise a 24 bit frame sync signal. This 24 bit sync signal is provided to a serial to parallel shift register which shifts the 24 bits of the frame sync signal from a serial format to a parallel format. The frame sync signal is next supplied to a comparator circuit which compares the frame sync signal to a reference sync signal and then generates a logic one sync pulse whenever the frame sync signal is identical to the reference sync signal.

This sync pulse is supplied to three of four 10 bit programmable counters to load each counter with a predetermined binary count provided by Programmable Read Only Memory. The first programmable counter counts the number of eight bit words in each Group 1 ... N; the second programmable counter counts the number of Groups N of eight bit words in a sub frame and the third programmable counter indicates the location of Automatic Gain Control data and Word Width data within the Sub Frame.

The fourth 10 bit programmable Counter which is loaded by a pulse from the first programmable counter indicates the location within each group of a Sub Frame where clusters of encoded doppler data are to be found.

The third programmable counter provides a logic one to a clock enable pulse circuit which then generates a one clock cycle pulse. This one clock cycle pulse is provided to a pair of three bit latches allowing the first latch to latch therein three bits of word width data and the second latch to latch therein three bits of automatic gain control data.

There is encoded within the eight bit words of each group of a sub frame one or more clusters of doppler words. A three bit gain word is latched into a third three bit latch just prior to each cluster of encoded doppler words being supplied to a word decoder circuit. The three bit gain word is supplied from the third three bit latch to the word decoder circuit with the gain being applied to each encoded doppler word within the cluster.

The word width data is also provided to the word decoder circuit and is applied to each eight bit word of each group of the sub frame having doppler data contained therein. Timing signals are provided by a pair of programmable three bit counters for supplying the three bit gain word from the third latch to the word decoder circuit and for decoding the eight bit words of each group of the sub frame having doppler data. The programmable three bit counters have the Automatic Gain Control data and Word Width data loaded therein allowing the counters to generate these timing signals.

The word decoder circuit in response to the three bit gain signal and the word width data, decodes each eight bit word of each group of the sub frame having doppler data and then provides a fourteen bit word for each doppler decoded by word decoder circuit. The location of the doppler data bits within each fourteen bit word is determined by the three bit gain signal and the number of doppler data bits within each fourteen bit word is determined by the word width data.

DETAILED DESCRIPTION OF THE PREFERRED EMBODIMENT

Figure 1:
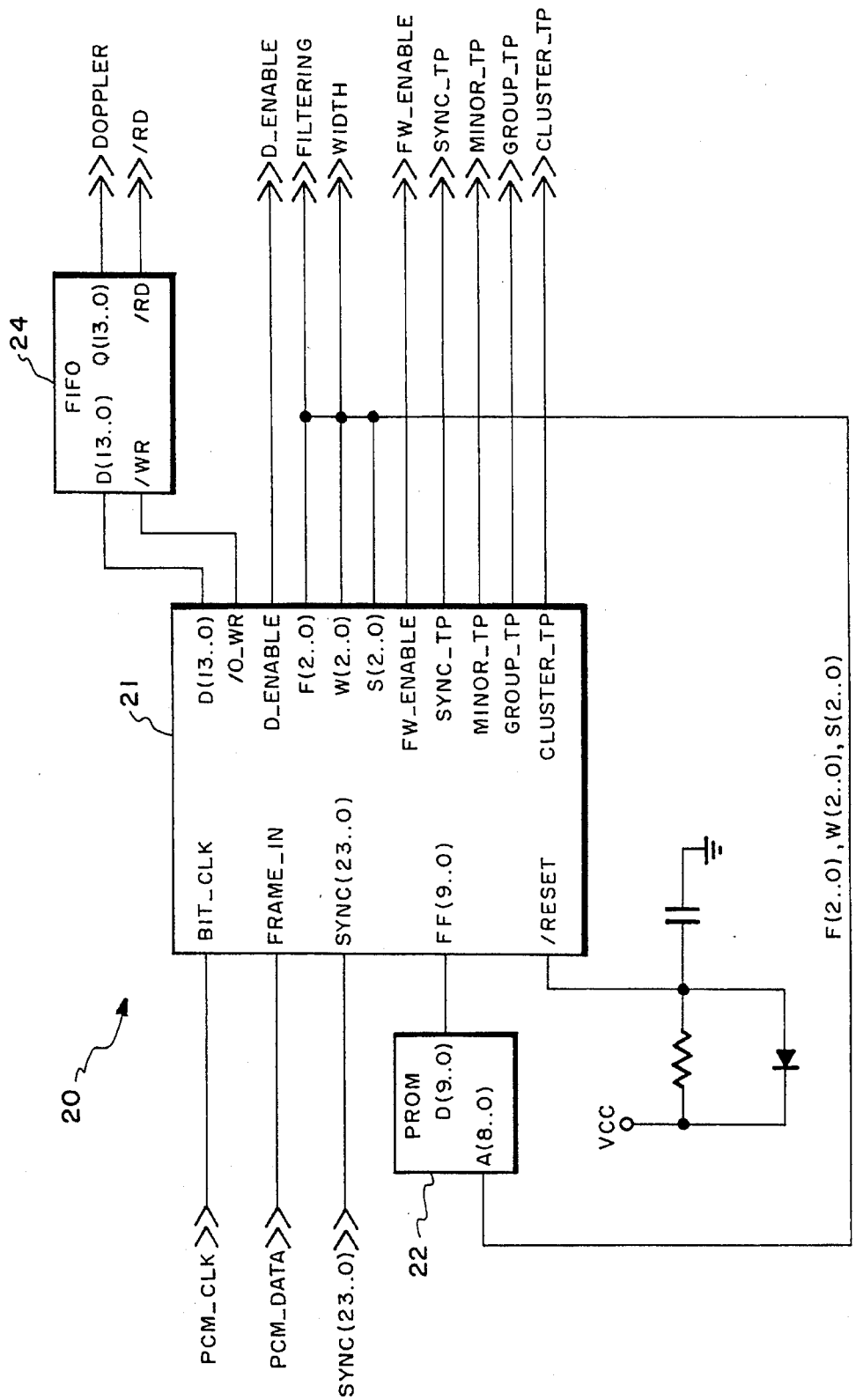
FIG. 1 is a block diagram of the digital circuit for decoding encoded doppler data received from a missile in flight constituting the present invention.

Referring to FIG. 1, there is shown a decoder circuit 20 for decoding encoded doppler data received from a missile in flight or the like. The encoded doppler data is provided through the PCM_DATA input of decoder circuit 20 to the FRAME_IN input of a doppler decoder circuit 21. There is also provided from an external clock generator (not illustrated) through the PCM_CLK input of decoder circuit 20 to the BIT_CLK input of doppler decoder circuit 21 a system clock signal (illustrated in FIG. 12A) which may be of a frequency of up to ten megahertz.

Figure 2A:
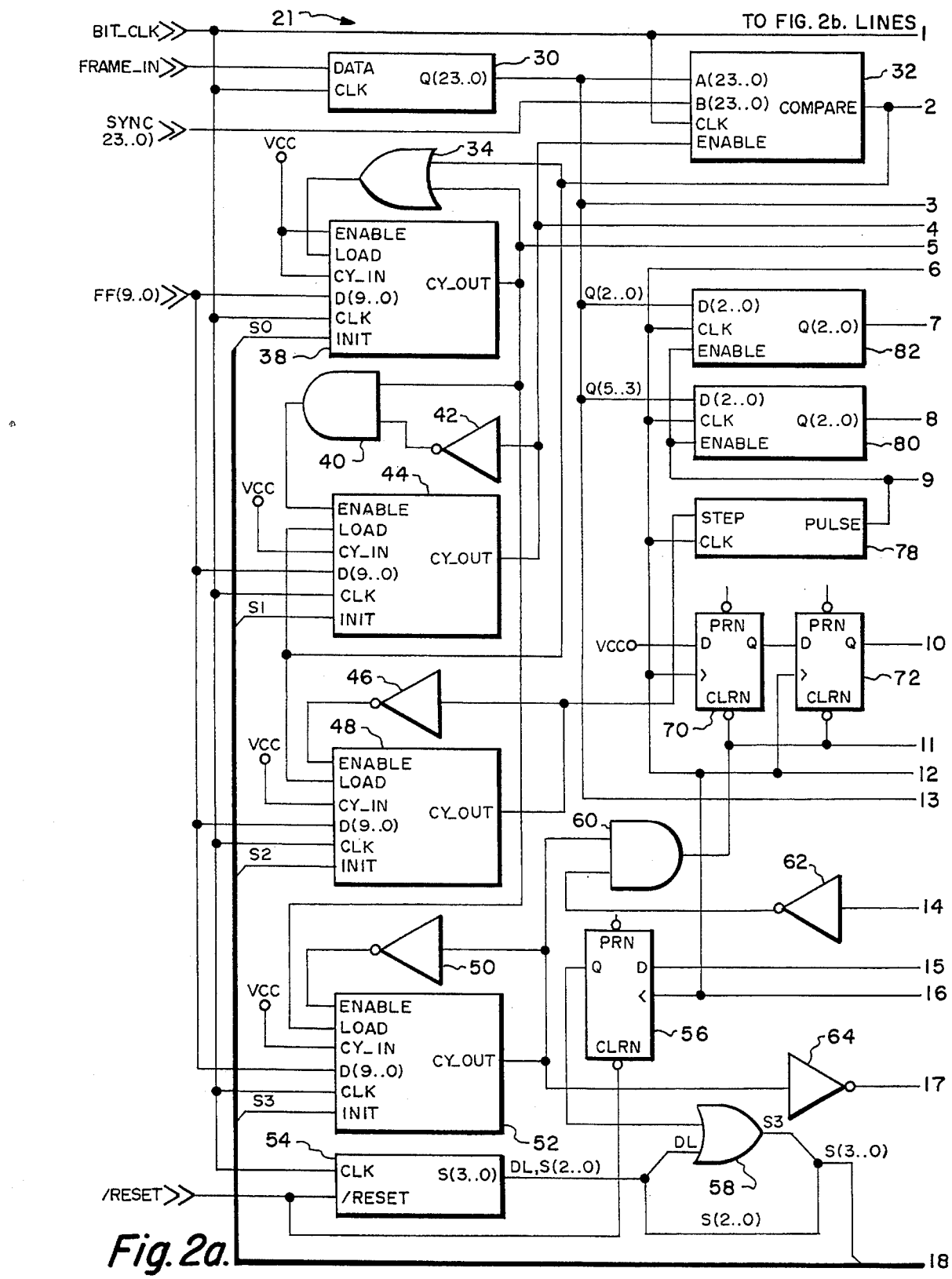
FIGS. 2a and 2b are a logic diagram of the doppler decoder circuit of FIG. 1.
Figure 2B:
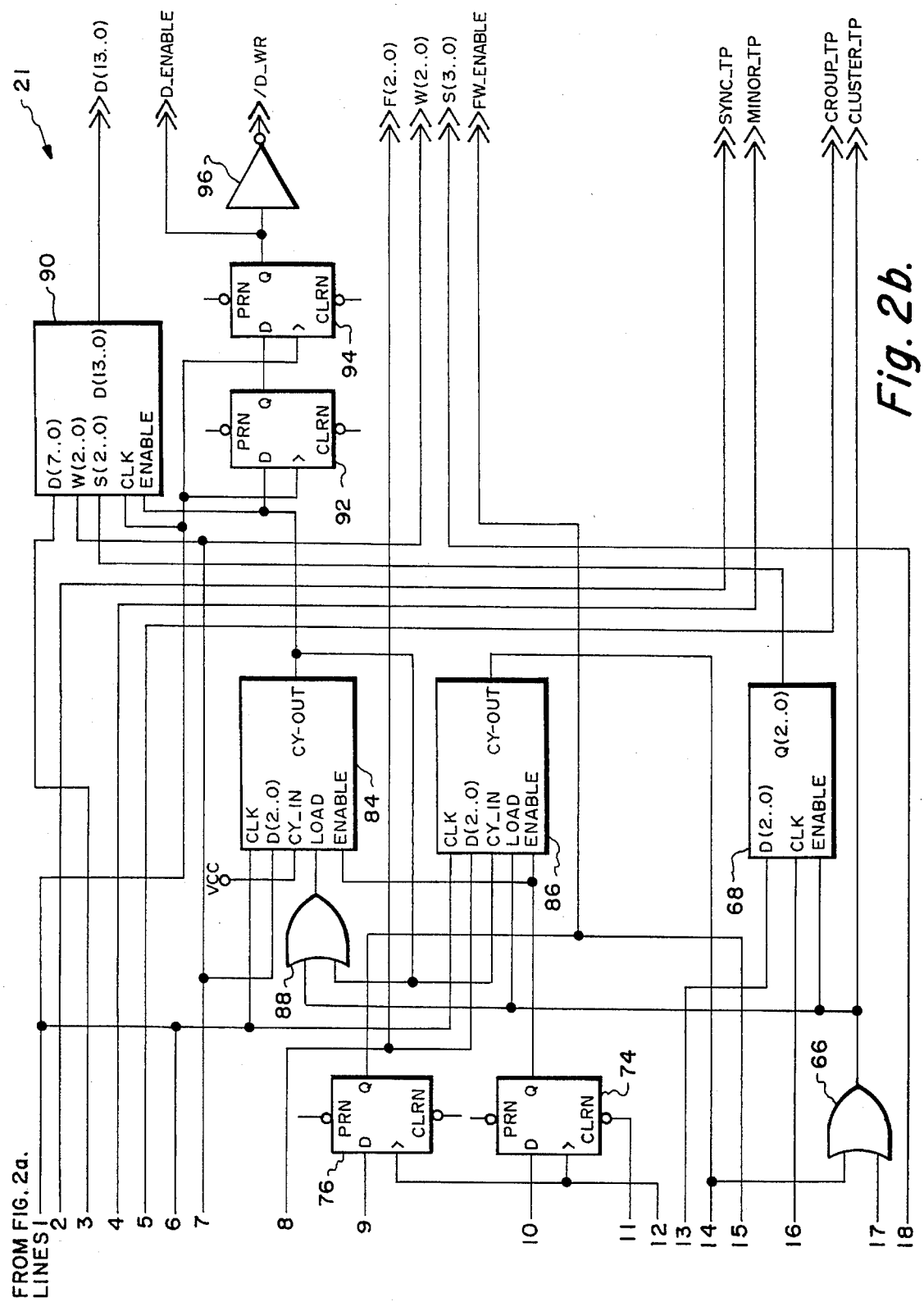
Figure 3A:
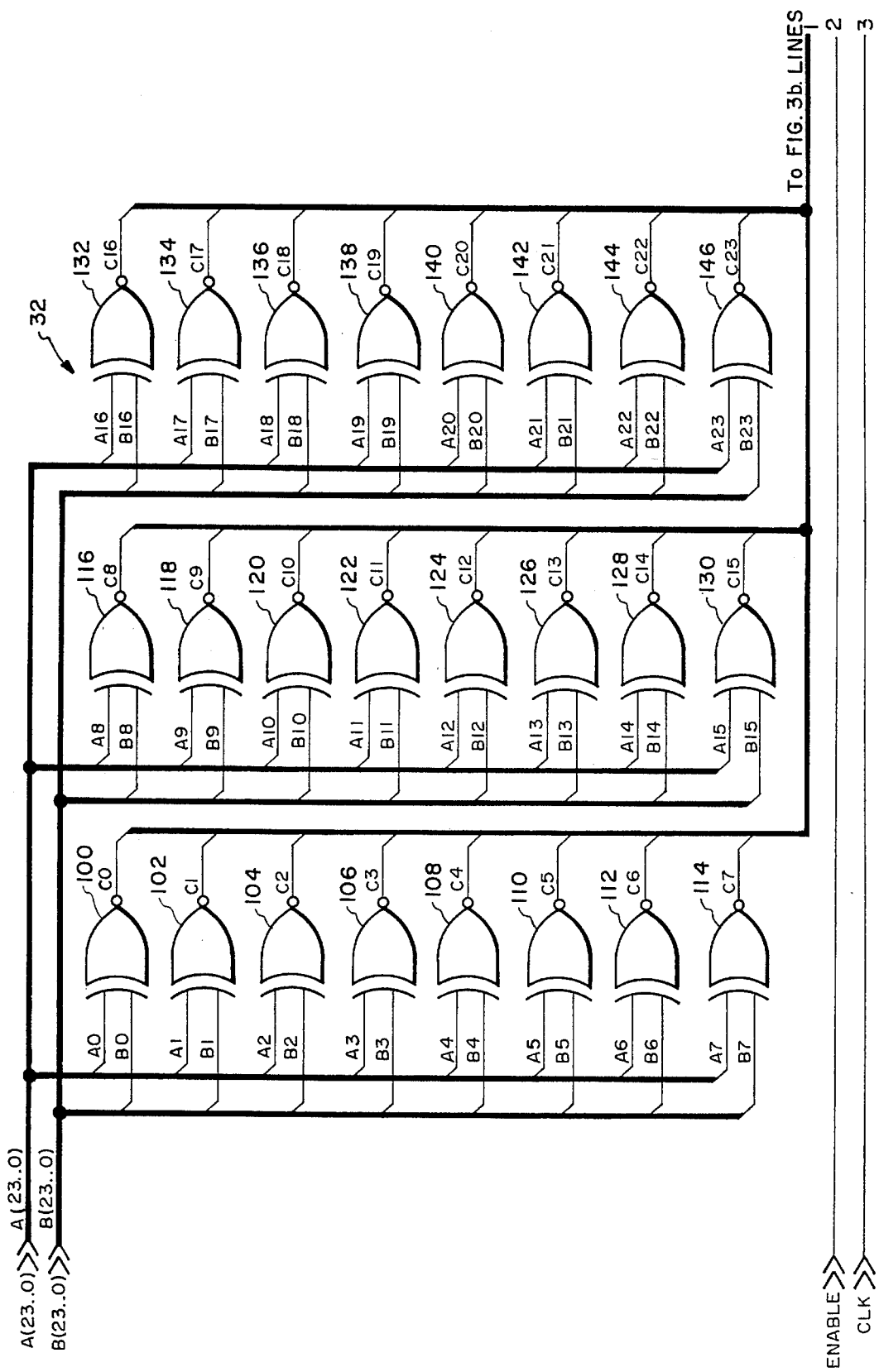
FIGS. 3a and 3b are a detailed logic diagram of the 24 bit comparator circuit of FIG. 2.
Figure 3B:
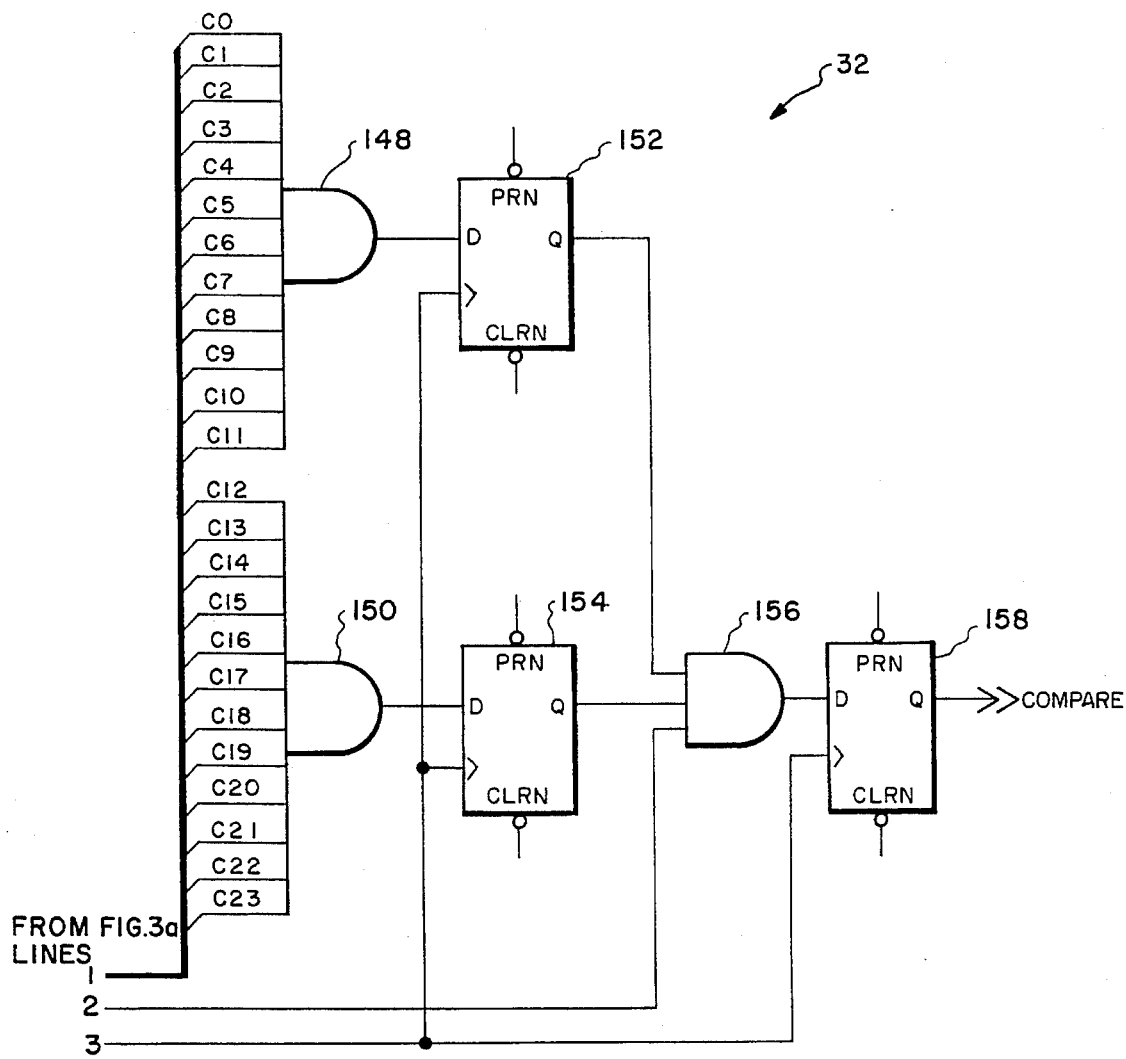

Referring to FIGS. 1, 2 and 3, a 24 bit reference sync signal is provided from an external source (not shown) through the SYNC[23 .. 0] inputs of decoder circuit 20 to the SYNC[23 .. 0] inputs of doppler decoder circuit 21. This 24 bit reference sync signal is then provided through B[23 .. 0] input of a 24 bit comparator circuit 32 to the first inputs of 24 EXCLUSIVE-NOR gates 100, 102, 104, 106, 108, 110, 112, 114, 116, 118, 120, 122, 124, 126, 128, 130, 132, 134, 136, 138, 140, 142, 144 and 146 with each of the 24 EXCLUSIVE-NOR gates receiving one bit of the reference sync signal.

Figure 11:
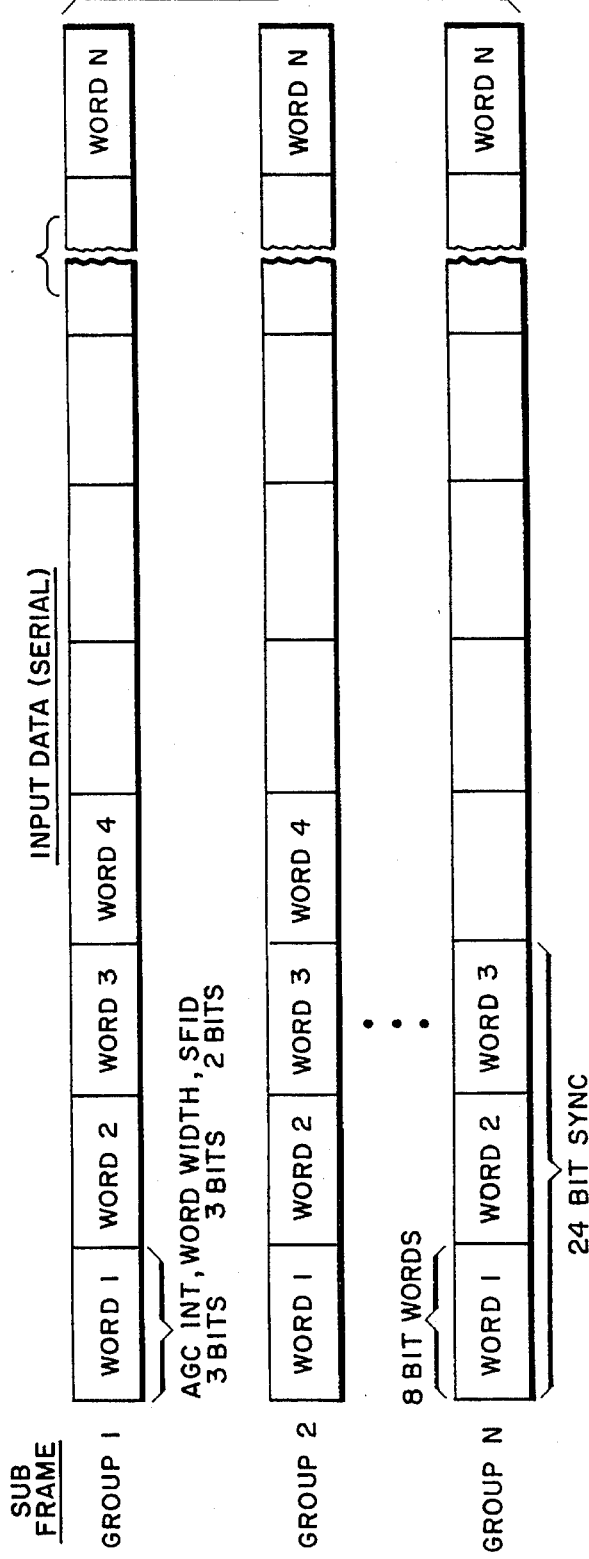
FIG. 11 illustrates the format of the Group 1 through Group N data words received from a missile in flight by the circuit of FIG. 1.

As shown in FIG. 11 Group N of the incoming encoded doppler data first provides three serial eight bit words having 24 bits which is the frame sync signal. The 24 bits of the frame sync signal are supplied to a serial to parallel shift register 30 which shifts the 24 bits of the frame sync signal from a serial format to a parallel format. The 24 bits of the frame sync signal are then supplied through the A[23 .. 0] inputs of 24 bit comparator circuit 32 to the first inputs of 24 EXCLUSIVE-NOR gates 100, 102, 104, 106, 108, 110, 112, 114, 116, 118, 120, 122, 124, 126, 128, 130, 132, 134, 136, 138, 140, 142, 144 and 146 with each of the 24 EXCLUSIVE-NOR gates receiving one bit of the frame sync signal.

For the purpose illustrating the operation of 24 bit comparator circuit 32 the following 24 bits will be used as the reference sync signal and frame sync signal:

```
       1 1 1 0 0 1 0 1 1 0 1 0 1 1 1 1 0 0 0 0 1 1 0 0
Bit 23............................0
```

The least significant bit of the reference sync signal is supplied to the first input of EXCLUSIVE-NOR gate 100, while the least significant bit of the frame sync signal is supplied to the second input of EXCLUSIVE-NOR gate 100. In a like manner, the most significant bit of the reference sync signal is supplied to the first input of EXCLUSIVE-NOR gate 146, while the most significant bit of the frame sync signal is supplied to the second input of EXCLUSIVE-NOR gate 146.

Since the least significant bit of the reference sync signal is a zero and the least significant bit of the frame sync signal is a zero, the output of EXCLUSIVE-NOR gate 100 will be a logic one which is supplied to the first input of an AND gate 148. Similarly, since Bit One of the reference sync signal and the frame sync signal are each at the logic zero state, the output of EXCLUSIVE-NOR gate 102 will be a logic one which is supplied to the second input of an AND gate 148. In a like manner, since Bit Two of the reference sync signal and the frame sync signal are each at the logic one state, the output of EXCLUSIVE-NOR gate 104 will be a logic one which is supplied to the third input of an AND gate 148. When each bit of the reference sync signal is the same as the corresponding bit of the frame sync signal, logic ones are supplied to each input of AND gates 148 and 150 resulting in logic ones at the output of each of these gates 148 and 150.

The logic one occurring at the output of AND gate 148 is supplied to the D input of a Flip-Flop 152, while the logic one occurring at the output of AND gate 150 is supplied to the D input of a Flip-Flop 154. These logic ones are next clocked to the Q outputs of Flip-Flops 152 and 154 by the system clock signal of FIG. 12A resulting in logic ones at the first and second inputs of an AND gate 156. Counter 44 generates a logic one Enable signal (illustrated in FIG. 12D) which is supplied through the Enable input of 24 bit comparator circuit 32 to the third input of AND gate 156 resulting in a logic one at the output of AND gate 156. This logic one is supplied to the D input of a Flip-Flop 158 and then clocked through Flip-Flip 158 to its Q output (illustrated in FIG. 12C) by the next clock pulse of the clock signal of FIG. 12A.

At this time it should be noted that the two clock cycle delay occurring within comparator circuit 32 in generating a sync pulse (illustrated in FIG. 12C) allows a three bit gain word to be latched into a three bit latch 68.

Since the word supplied to the FRAME_IN input of doppler decoder circuit 21 has changed that is the fourth word of Group N of FIG. 11 is not a part of the frame sync signal, the output of 156 will change to the logic one state. A third successive clock pulse of the clock signal of FIG. 12A will clock the logic zero at the D input of 158 to its Q output (illustrated in FIG. 12C). The sync pulse of FIG. 12C is supplied through an OR gate 34 to the LOAD input of counter 38.

Figure 4:
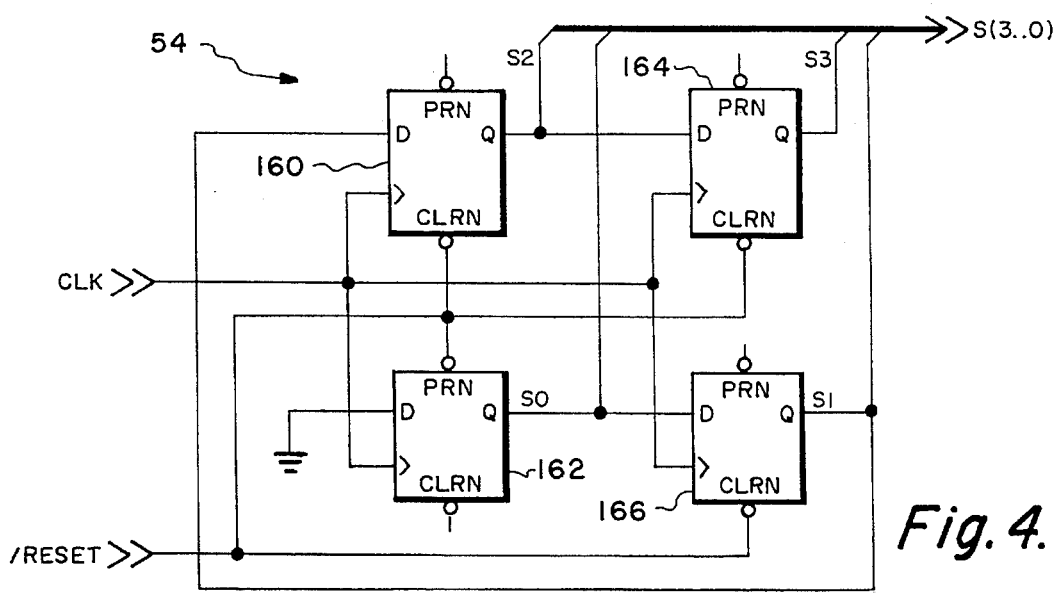
FIG. 4 is a detailed logic diagram of the input selector circuit of FIG. 2.
Figure 5:
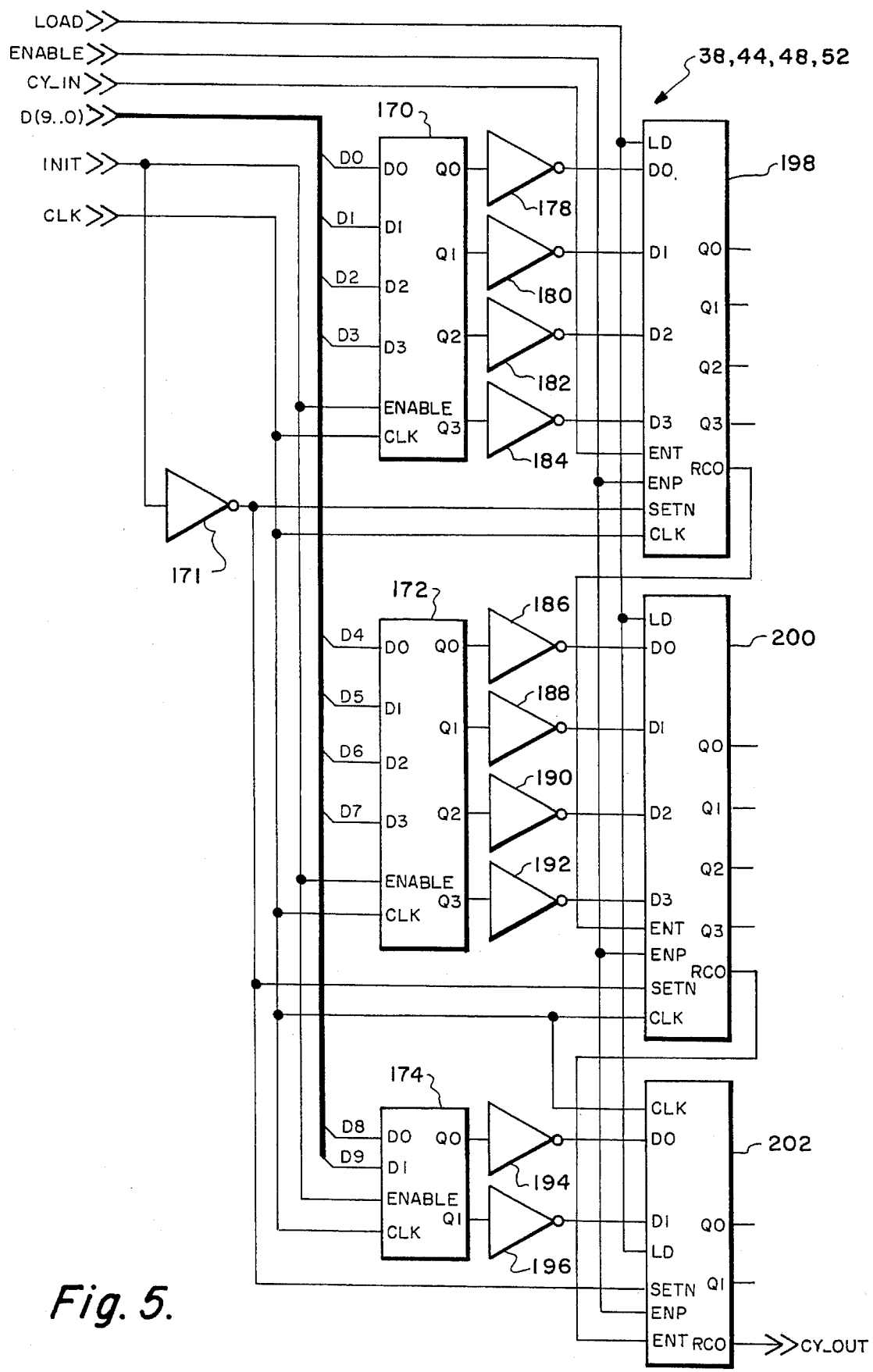
FIG. 5 is a logic diagram of the programmable 10 bit counters of FIG. 2.

Referring to FIGS. 1, 2 and 4, an input selector circuit 54 comprising Flip-Flops 160, 162, 164 and 166 generates logic one enable signals to programmable bit counters 38, 44, 48 and 52 which configure frame format. When doppler decoder circuit 21 is powered up a logic zero is supplied to the/RESET input of input selector circuit 54. This logic zero sets the Q output of Flip-Flop 162 to the logic one state and clears the output of Flip-Flops 160, 164 and 166 to the logic zero state. The logic one at the Q output of Flip-Flop 162 is supplied to the D input of Flip-Flop 166 and the INIT input of counter 38 initializing counter 38.

Figure 12:
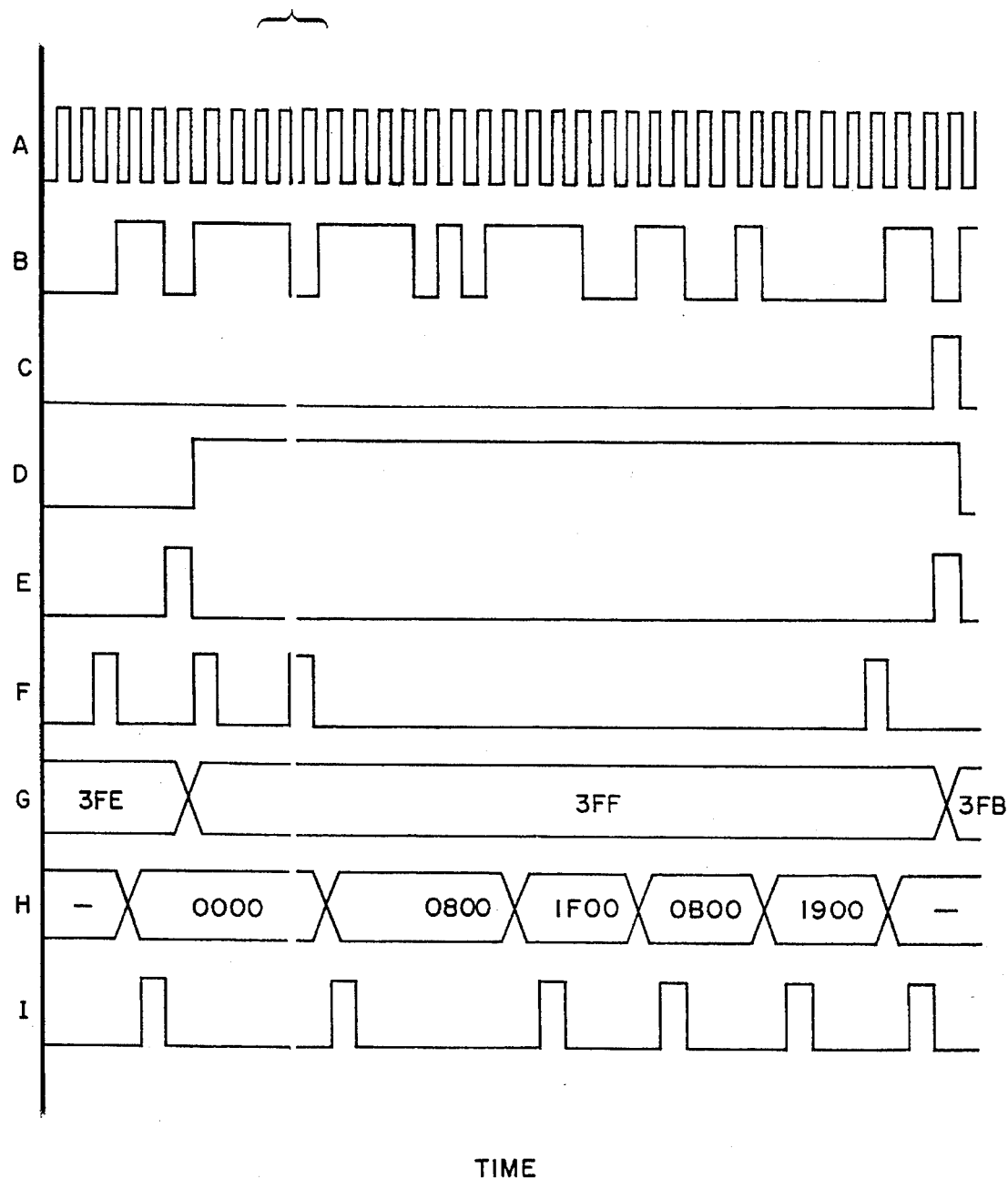
FIG. 12 illustrates the timing waveforms occurring at the outputs of some of the logic elements of FIG. 3.

When the/RESET signal transitions to the logic one state the first clock pulse of the clock signal of FIG. 12A occurring after the transition will cause the Q output of Flip-Flop 162 to transition to the logic zero state and Q output of Flip-Flop 166 to transition to the logic one state. The logic one at the Q output of Flip-Flop 166 is supplied to the D input of Flip-Flop 160 and the INIT input of counter 44 initializing counter 44.

Counters 48 and 52 are initialized in exactly the same manner respectively by Flip-Flops 160 and 164 of input selector circuit 54.

Referring now to FIGS. 1, 2, 5, 6 and 7, counter 38 is loaded with a binary number which is representative of the number of eight bit words in each Group 1... N. The number of words in each Group 1... N is provided by Programmable Read Only Memory 22 through FF[9 ... 0] inputs of doppler decoder circuit 21 to D[9 .. 0] inputs of counter 38. The logic one initialization signal from Flip-Flop 162 initializes latches 170, 172 and 174 of counter 38. This allows the first clock pulse of the clock signal of FIG. 12A occurring after latches 170, 172 and 174 are initialized to latch the nine bits D0–D9 at the D0–D3 inputs of latches 170 and 172 and D0–D1 inputs of latches 174 into latches 170, 172 and 174.

Figure 6:
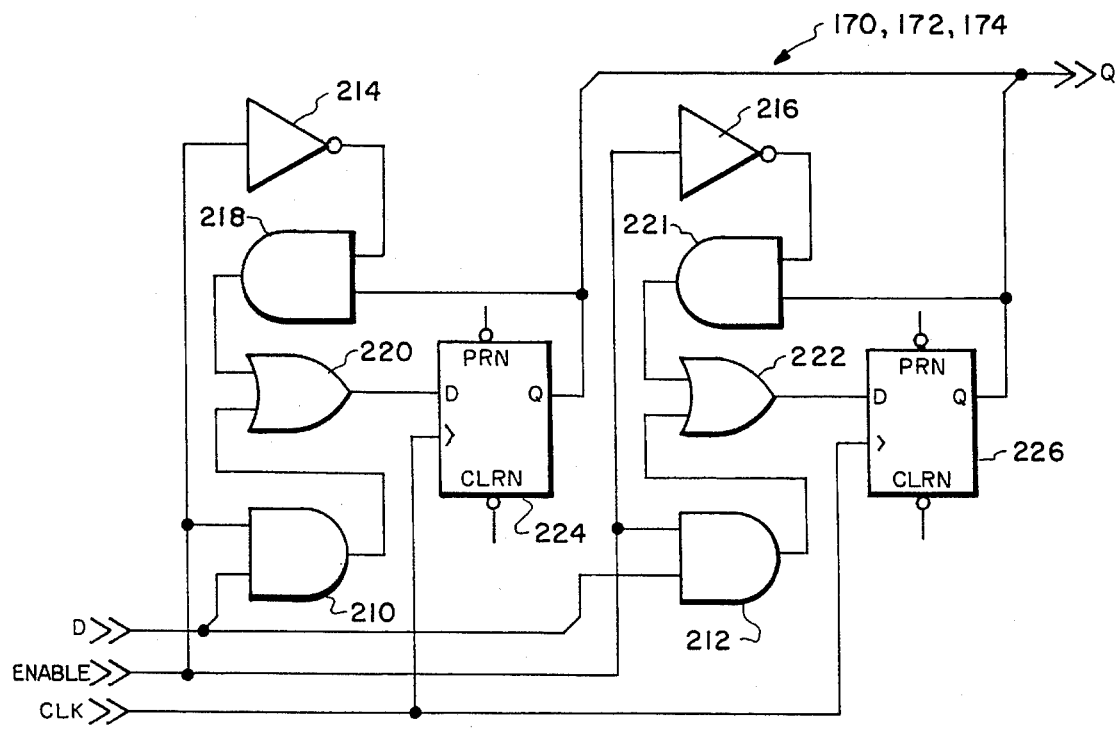
FIG. 6 is a detailed logic diagram of the 2 bit latch of FIG. 5
Figure 7:
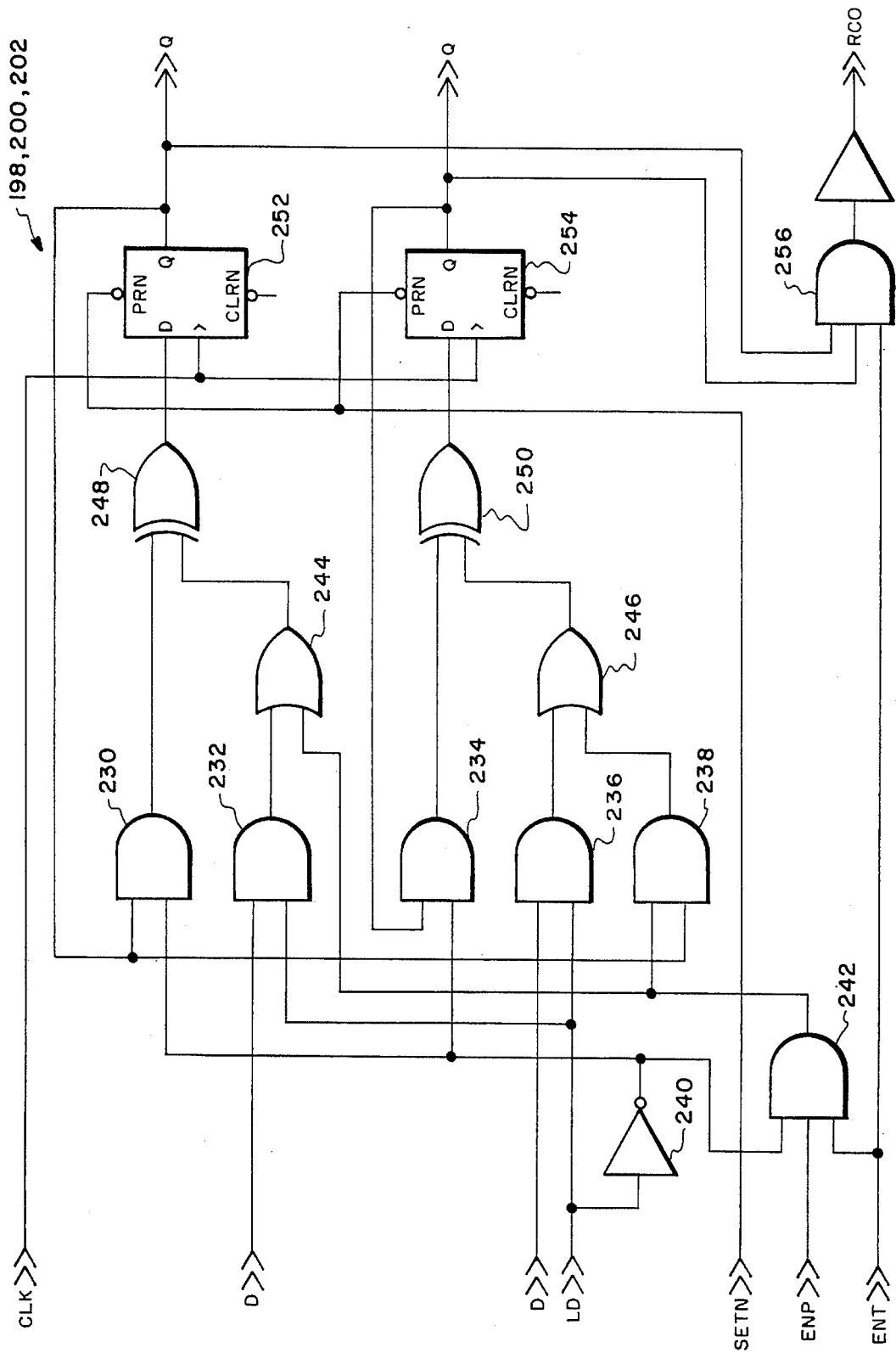
FIG. 7 is a detailed logic diagram of the 2 bit counter of FIG. 5.
Figure 9A:
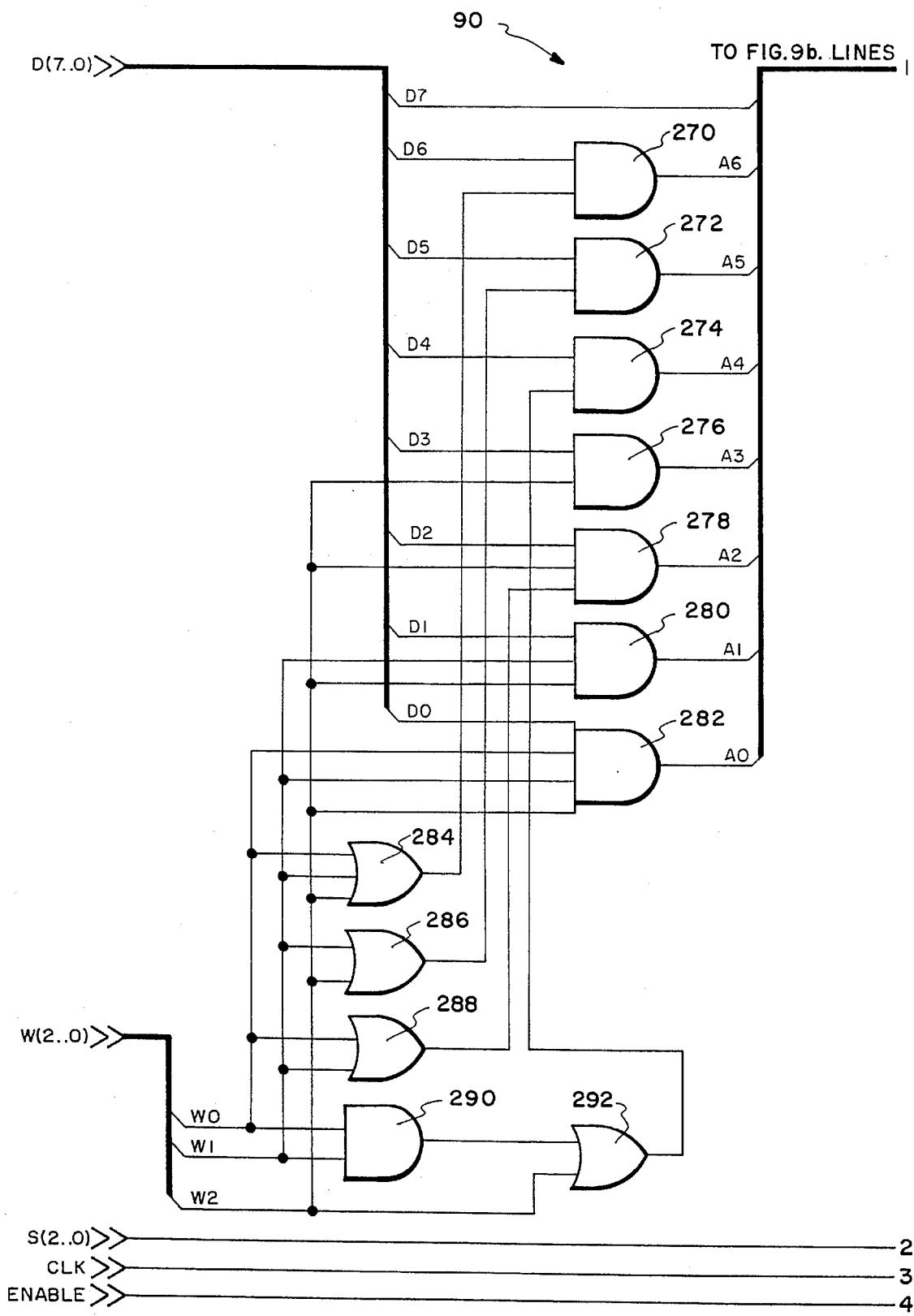
FIGS. 9a and 9b are detailed a logic diagram of the word decoder circuit of FIG. 2.
Figure 9B:
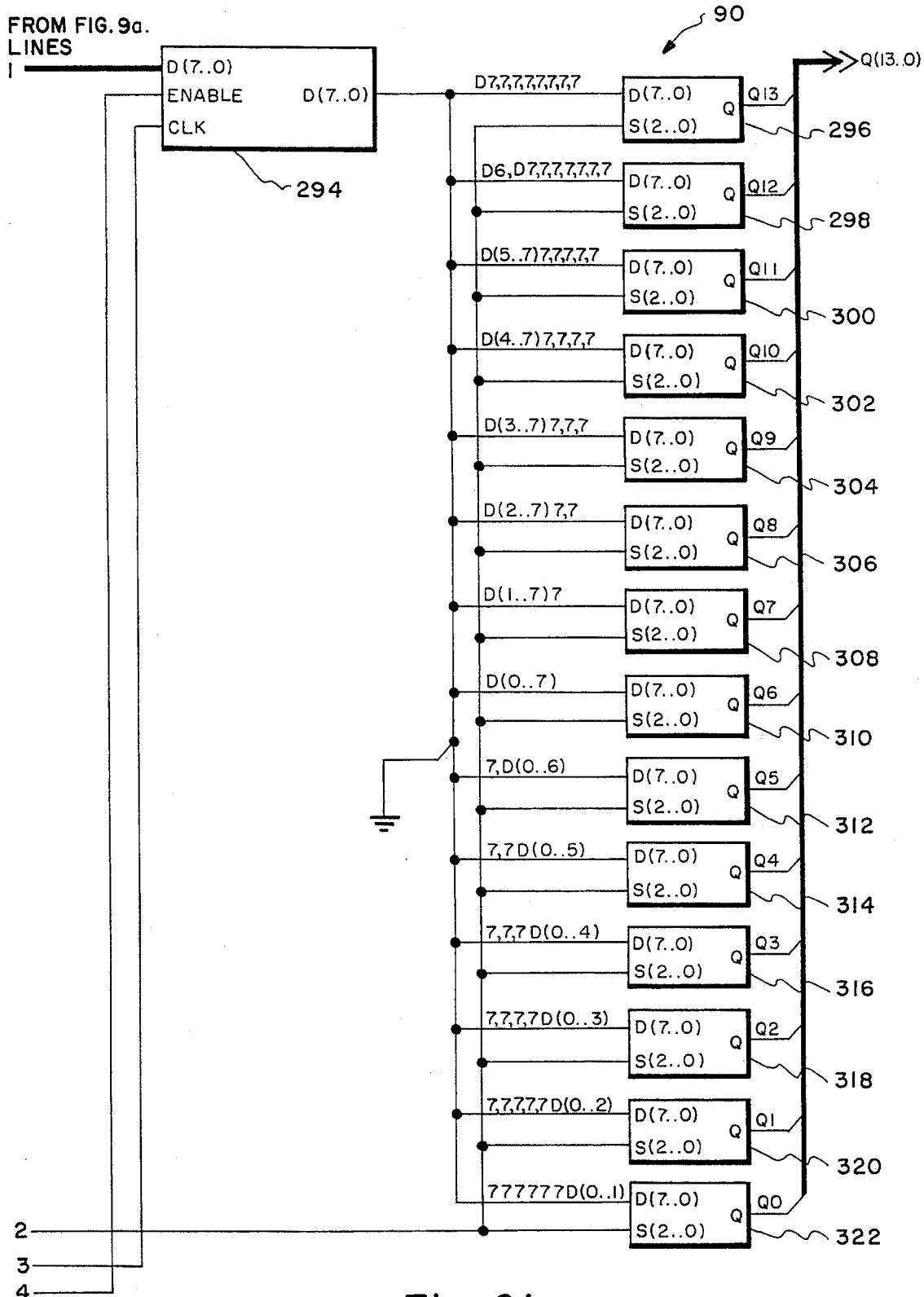

At this time it should be noted that the logic circuit of FIG. 6 illustrates circuitry for two of the four bits of latches 170 and 172 and the two bits of latch 174. In a like manner, the logic circuitry of FIG. 7 illustrates the circuitry for two of the four bits of counters 198 and 200 and the two bits of counter 202.

For the purpose of illustrating the operation of counter 38 the number of words in each Group 1... N is selected to be twelve. The D9, D8, D7, D6, D5, D4, D3, D2, D1 and D0 bits are respectively 0,0,0,0,0,1,1,0,0. Thus, logic ones are provided to the D2 and D3 inputs of latch 170, while logic zeros are provided to the D0 and D1 inputs of latch 170. This results in logic ones being latched to the Q2 and Q3 outputs of latch 170 and logic zeros being latched to the Q0 and Q1 outputs of latch 170 by the clock signal of FIG. 12A. The clock signal of FIG. 12A will also latch logic zeros to the D3-D0 outputs of latch 172 and the D1–D0 outputs of latch 174. Inverters 182 and 184 invert the logic ones supplied to their inputs to logic zeros, while inverters 178, 180, 186, 188, 190, 192, 194 and 196 invert the logic zeros to logic ones. This results in logic zeros being supplied to the D2 and D3 inputs of counter 198 and logic ones being supplied to the D0 and D1 inputs of counter 198, the D0, D1, D2 and D3 inputs of counter 200 and the D0 and D1 inputs of counter 202.

Since FIG. 6 illustrates the circuitry for two of the four data bits provided to latch 170 with the circuitry for the remaining two bits provided to latch 170 being identical, the following description of the operation of latch 170 will be with respect to the bits D2 and D3. Bit D2 which is a logic one is supplied to AND gate 210 passing through AND gate 21 and then through OR gate 220 to the D input of Flip-Flop 224. In a like manner, Bit D3 which is also a logic one is supplied to AND gate 212 passing through AND gate 212 and then through OR gate 222 to the D input of Flip-Flop 226. The clock signal of FIG. 12A next clocks the logic ones at the D inputs of Flip-Flops 224 and 226 to their Q outputs resulting in logic ones at the Q2 and Q3 outputs of latch 170.

When the initialization signal from Flip-Flop 162 transitions to a logic zero inverters 214 and 216 invert the logic zero to a logic one resulting in logic ones at the first inputs of AND gates 218 and 221 enabling AND gates 218 and 221. This, in turn, latches the logic ones into Flip-Flops 224 and 226 since the D inputs to latches 224 and 226 will remain at the logic one state.

Since FIG. 7 illustrates the circuitry for two of the four data bits provided to counter 198 with the circuitry for the remaining two bits provided to counter 198 being identical, the following description of the operation of counter 198 will be with respect to the bits D2 and D3. Bits D2 and D3 which are logic zeros are provided to the D2 and D3 inputs of counter 198. The sync pulse of FIG. 12C which is supplied to the LOAD input of counter 38 by circuit 32 enables AND gates 232 and 236. The CY_IN and ENABLE inputs to counter 38 are tied to +5VDC resulting in ENT input of counter 198 and the ENP inputs of counters 198, 200 and 202.

At this time it should be noted that the Q0–Q3 outputs of counters 198 and 200 and the Q0–Q1 outputs of counter 202 are set to the logic one state by applying a logic zero to the SETN inputs of counters 198, 200 and 202. This occurs whenever the INIT input of counter 38 is at the logic one state, that is whenever the Q output of Flip-Flop 162 transitions to the logic one state.

Since AND gates 232 and 236 are enabled the logic zeros occurring at the D2 and D3 inputs of counter 198 respectively pass through AND gates 232 and 236 and then through OR gates 244 and 246 to the first inputs of EXCLUSIVE-OR gates 248 and 250. Since the second inputs to EXCLUSIVE-OR gates 248 and 250 are at the logic zero state, that is AND gates 230 and 234 are disabled when the LOAD input of counter 38 is a logic one, the output of EXCLUSIVE-OR gates 248 and 250 will be at the logic zero state. These logic zeros are supplied to the D inputs of Flip-Flops 252 and 254 and clocked through Flip-Flops 252 and 254 by the first clock pulse of the clock signal of FIG. 12A which occur after bits D2 and D3 are loaded into counter 38.

When the LOAD input of counter 38 transitions to the logic zero state AND gates 232 and 236 are disabled while AND gates 230 and 234 are enabled. This allows counter 198 to count up to a count of twelve. When counter 198 reaches a count of twelve the outputs of Flip-Flops 252 and 254 will be at the logic one state resulting in a logic one at the output of AND gate 256 which, in turn, results in a logic one being provided through the RCO (carry out) output of latch 198 to the ENT input of counter 200. Since each of the Q outputs of the four Flip-Flops of counter 200 are at the logic one state, the RCO (carry out) output of counter 202 will generate a logic one at its output which is supplied to the ENT input of counter 202. Since each of the Q outputs of the two Flip-Flops of counter 202 are at the logic one state, the RCO (carry out) output will generate a logic one pulse (illustrated by FIG. 12E) at its output which is supplied through OR gate 34 to the LOAD input of counter 38 reloading a count of twelve into the counters 198, 200 and 202 of counter 38. The logic one pulse of FIG. 12E which is repeated for every twelve words supplied to doppler decoder circuit 21 is also provided to the first input of an AND gate 40.

Counter 44 counts the number of Groups N of eight bit words in a minor frame or Sub Frame. When the words of Group N–1 are counted by counter 38 the logic one pulse 45 of FIG. 12E is supplied to the first input of AND gate 44. Since the output of counter 44 is a logic zero (illustrated in FIG. 12D) inverter 42 will invert this logic zero to a logic one enabling AND gate 40 which allows the logic one pulse 45 of FIG. 12E to pass through AND gate 40 to the ENABLE input of counter 44. The next clock pulse of the clock signal of FIG. 12E will cause counter 44 to increment to group N. This, in turn, results in a logic one at the CY_OUT output of counter 44 (illustrated in FIG. 3D) since each of the Flip-Flops of the counters 198, 200 and 202 of counter 44 are now at the logic one state. It should be noted that the count within counter 44 is now hexadecimal 3FF, the binary value being 1,1,1,1,1,1,1,1,1,1,1,1. The logic one of FIG. 12D is then supplied to the ENABLE input of 24 bit comparator circuit 32.

Counter 48 provides a logic one pulse at its CY_OUT output which indicates the location of Automatic Gain Control data and Word Width data within the Sub Frame. Counter 48 is loaded with a count from PROM 22 by the sync pulse of FIG. 12C. For the purpose of illustrating the operation of counter 48, a count of sixty four is loaded from PROM 22 into counter 48 by the sync pulse of FIG. 12C. A count of 64 indicates that there is a requirement for counter 48 to count 64 bits of the Sub Frame of FIG. 11 before Word One of Group One is provided to the FRAME_IN input of doppler decoder circuit 21 for processing by doppler decoder circuit 21.

A count of binary 64 which is 0,0,0,0,0,0,1,0,0,0 is loaded into latches 170 and 172 through their D0, D1, D2 and D3 inputs and latch 174 through its D0 and D1 input by the logic one pulse provided by Flip-Flop 160. This count is inverted to 1,1,1,1,1,1,0,1,1,1 by inverters 178–196 and then supplied to the D0, D1, D2 and D3 inputs of counters 198 and 200 and the D0 and D1 inputs of counter 202. The sync pulse of FIG. 12C then loads counters 198, 200 and 202 of counter 48 with the count of 64.

The system clock signal of FIG. 12A will increment counter 48 until the count reaches 64 at which time the CY_OUT output of counter 48 will transition to a logic one. This logic one is supplied to inverter 46 which inverts the logic one to a logic zero which is next supplied to the ENABLE input of counter 48 disabling counter 48 which leaves the CY_OUT output of counter 48 at the logic one state until another sync pulse occurs.

Figure 8:
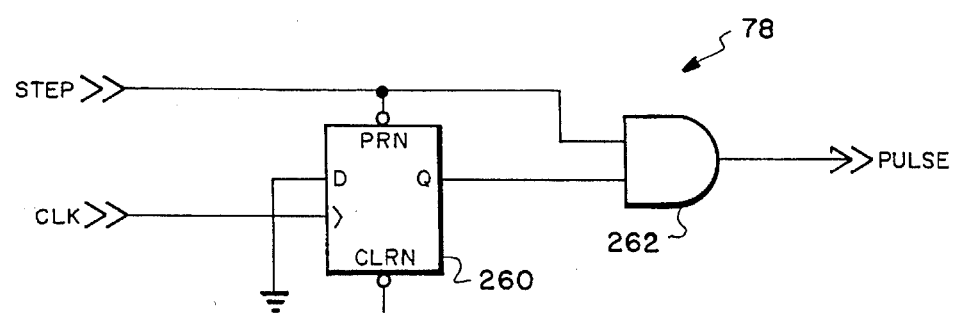
FIG. 8 is a detailed logic diagram of the clock enable pulse circuit of FIG. 2.

Referring to FIGS. 2 and 8, the logic one from the CY_OUT output of counter 48 is supplied through the STEP input of a clock enable pulse circuit 78 to the first input of AND gate 262 which is enabled by the logic one previously provided by the Q output of Flip-Flop 260 to the second input of AND gate 262. A one clock cycle pulse is generated by AND gate 262 since the next transition of the clock signal of FIG. 12A will clock the logic at the D input of Flip-Flop 262 to its Q output.

The one clock cycle pulse generated by clock enable pulse circuit 78 is supplied to the D input of Flip-Flop 76 and clocked to its Q output by the clock signal of FIG. 12A with Flip-Flop 76 functioning as a one clock cycle delay circuit. The one clock cycle pulse from Flip-Flop 76 is clocked through a Flip-Flop 56 and then passes through an OR gate 58 to the INIT input of counter 52 reloading counter 52.

It should be noted that the pulse supplied to the INIT input of counter 52 is generated by Flip-Flop 164 of input selector circuit 54 upon the powering up of doppler decoder circuit 21 and by the combination of counter 48, clock enable pulse circuit 78 and Flip-Flops 76 and 56 during each Sub Frame.

After the sync pulse of FIG. 12C is supplied to the LOAD input of circuit 48, counter 48 will count out the count value loaded into counter 48 which for the purpose of illustrating the operation of circuit 21 was selected as a count of 64. When counter 48 reaches a count of 64, counter 48 provides a logic one signal to the clock enable pulse circuit 78. Clock enable pulse circuit 78 generates the one clock cycle pulse supplied to the ENABLE inputs of three bit latches 80 and 82.

It should be noted that the three bit latches 80 and 82 are identical to the latch illustrated in FIG. 6 with the addition of one bit. The clock signal of FIG. 12A clocks the data bits to the Q outputs of the Flip-Flops of latches 80 and 82 and the one clock cycle pulse supplied to the ENABLE inputs of latches 80 and 82 latches the data into latches 80 and 82 allowing latches 80 and 82 to retain their data. Latch 80 holds the three bits of Word One, Group One (FIG. 11) which represent the Automatic Gain Control Interval or filtering information for each encoded doppler data word within Groups 1 through N of the sub frame. Latch 82 holds the three bits of Word One, Group One (FIG. 11) which represent the Word Width for each encoded doppler data word within Groups 1 through N of the sub frame. Latches 80 and 82 retain the three bits latched therein through the remainder of the Sub Frame.

At this time it should be noted that the 24 bit frame sync signal for a particular sub frame is provided by the first 24 bits of Group N of the previous sub frame.

Figure 13:
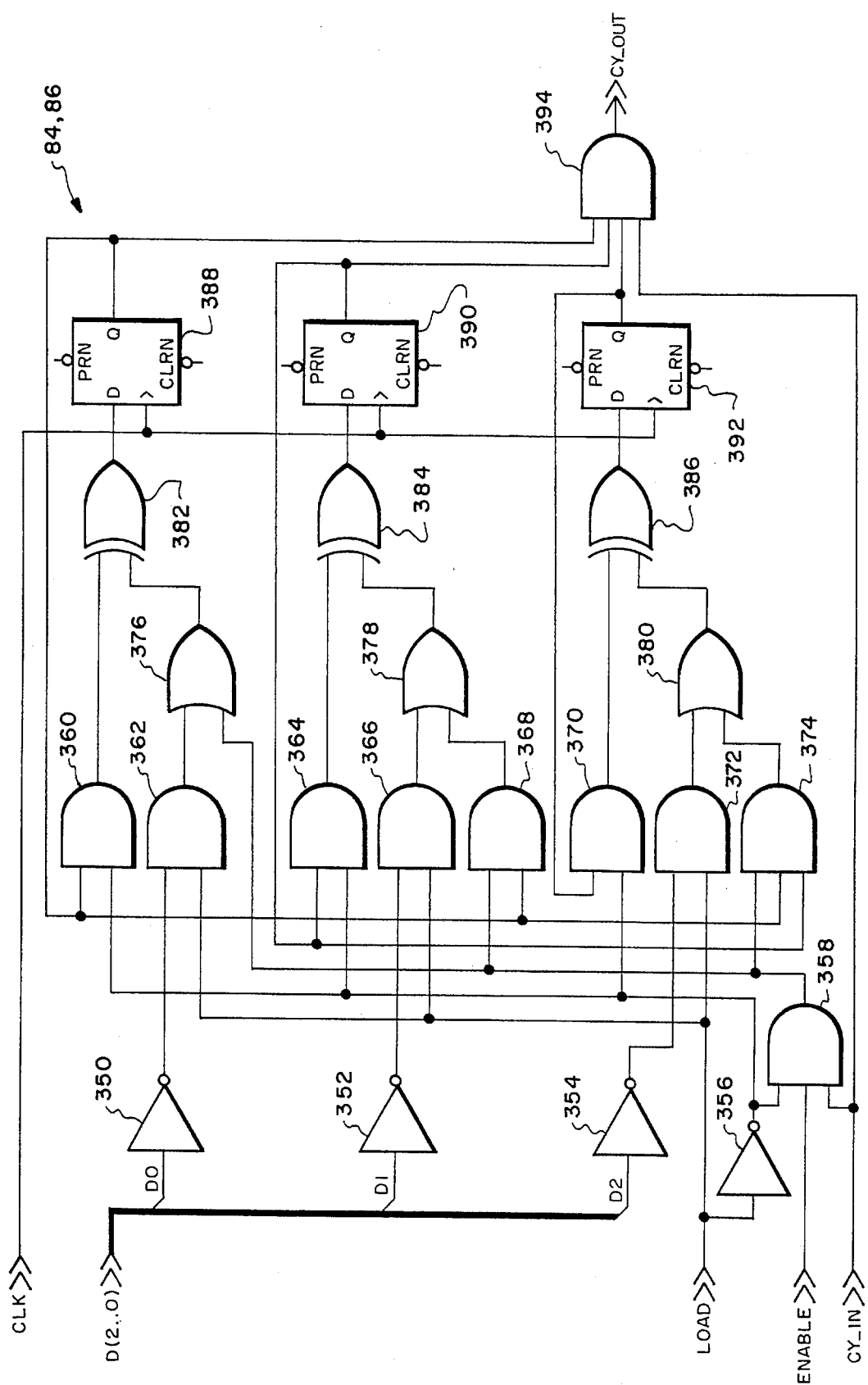
FIG. 13 is a detailed logic diagram of one of the programmable three bit counters of FIG. 2.

Referring to FIGS. 1, 2 and 13, the three bits Q[2..0] latched into latch 82 are supplied to D[2..0] inputs of a programmable three bit counter 84. Similarly, the three bits Q[5..3] latched into latch 80 are supplied to D[2..0] inputs of a programmable three bit counter 86. For the purpose of illustrating the operation of counters 84 and 86, the word width selected is four and the filtering data is five, which respectively requires that a binary three be loaded into counter 84 and a binary four be loaded into counter 86. Thus, counter 84 receives a logic zero as bit D2, a logic one as bit D1 and a logic one as bit D0. Counter 86 receives a logic one as bit D2, a logic zero as bit D1 and a logic zero as bit D0.

Figure 14:
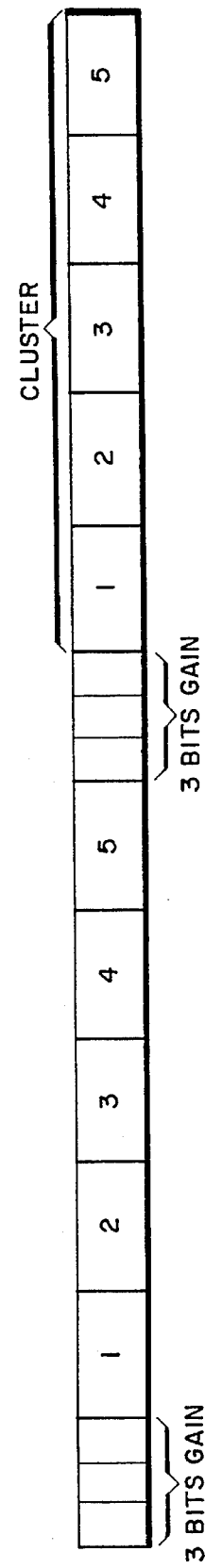
FIG. 14 illustrates an example of a doppler word cluster to be processed by the doppler decoder circuit of FIG. 2.

At this time, it should be noted that the words illustrated in the example of FIG. 14 are four bits in length and contain encoded doppler data information provided from an external source, such as for example, a guided missile. These doppler words are transmitted in clusters of five doppler words (as illustrated in the example of FIG. 14) with the three bit gain signal for each cluster being subject to change every five doppler words. The number of bits in a group for the purpose of illustrating the operation of circuit 21 is set at 96 bits per group and the number of clusters in each group is set at two (as illustrated in the example of FIG. 14). It should also be noted that the count loaded into counter 48 for the example illustrated in FIG. 14 is seventy six. After counter 48 reaches a count of 76 the CY_OUT output will transition to a logic one allowing clock enable pulse circuit 78 to generate a one clock cycle pulse which then supplied to the ENABLE input of latches 80 and 82. This one cycle clock pulse from circuit 78 then latches the three bit word width into latch 82 and the three bit automatic gain control into latch 80.

For counter 84, inverters 350, 352 and 354 will respectively provide at their outputs 0,0,1. The logic zero occurring at the output of inverter 350 will pass through AND gate 362, OR gate 376 and EXCLUSIVE-OR gate 382 to Flip-Flop 388 of counter 84. In a like manner, the logic zero occurring at the output of inverter 352 is supplied to Flip-Flop 390 and the logic one occurring at the output of inverter 354 is supplied to Flip-flop 392 of counter 84.

The logic one state required to load Flip-Flops 388, 390 and 392 of counter 84 is provided by counter 52 through inverter 64 and OR gates 66 and 88 and is also provided by the output (CY_OUT) of counter 84 through OR gate 88. In addition this logic one state is provided at the CY_OUT output of counter 86 passing through OR gates 66 and 68.

The logic one state required to load Flip-Flops 388, 390 and 392 of counter 86 with bits D2, D1 and D0 from latch 80 is provided by counter 52. This logic one state is also provided at the CY_OUT output of counter 86 passing through OR gate 66 to the LOAD input of counter 86 as well as the LOAD input of counter 84 after passing through OR gate 88.

The logic one signal for enabling counters 84 and 86 to count is provided by a three bit delay circuit comprising Flip-Flops 70, 72 and 74 with the clock signal of FIG. 12A incrementing counters 84 and 86 whenever the output of AND gate 60 is at the logic one state. This logic one signal from the three bit delay circuit is supplied to the ENABLE inputs of counters 84 and 86 whenever the CY_OUT output of counter 52 is a logic one and the CY_OUT output of counter 86 is a logic zero.

The count for counter 84 is four, five, six and seven before a count of three is reloaded into the D[2 . . 0] inputs of counter 84. Since the binary numbers loaded into the D0, D1, and D2 inputs of counter 86 are respectively 0, 0, 1, a count of three will occur at the Q outputs of Flip-Flops 388, 390 and 392, that is the Q outputs of Flip-Flops 388, 390 and 392 will be respectively 1,1,0. The clock signal of FIG. 12A will next cause counter 84 to count three, four, five, six and seven before a count of four is reloaded into the D[2 . . 0] inputs of counter 86.

It should be noted that counters 84 and 86 function as a single counter with counter 84 being incremented by a count of four to a count of seven. When the count at Flip-Flops 388, 390 and 392 is seven, a logic one occurs at the CY_OUT output of counter 84 which is supplied to the CY_IN input of counter 86 allowing the clock signal of FIG. 12A to increment counter 86 by a count of one.

As shown in the example of FIG. 14, after five four bit doppler words are counted by the combination of counters 84 and 86, a three bit delay is required for the gain bits. This delay occurs when a logic one pulse is provided at the CY_OUT output of counter 86. The logic one pulse is next inverted by inverter 62 to a logic zero pulse and then supplied through AND gate 60 to the CLRN inputs of Flip-Flops 70, 72 and 74 resetting the Q outputs to a logic zero state. The three clock count delay required by counters 84 and 86 to account for the three gain bits between clusters of doppler data (as illustrated in FIG. 11) is provided by Flip-Flops 70, 72 and 74.

Counter 52 indicates the location within each group of a Sub Frame where the clusters of encoded doppler data are to be found. For the example illustrated by FIGS. 11 and 14 each group of the Sub Frame is set at 96 bits or twelve eight bit words.

Twenty four bits of data are provided to comparator circuit 32 before the sync signal of FIG. 12C is generated by circuit 32. Since a three bit gain signal proceeds a cluster of five doppler words (as illustrated in the example of FIG. 14) and each clusters has twenty encoded doppler data bits for a total of forty six bits, the count loaded into counter 52 will be twenty six. Counter 52 will begin its count with the occurrence of the first pulse 47 of the signal of FIG. 12E. This pulse 47 occurs simultaneously with the sync signal of FIG. 12C.

When the count reaches twenty six the CY_OUT output of counter 52 transitions to the logic one state and will remain at the logic one state until counter 52 is reloaded.

After the sync signal of FIG. 12C occurs, counter 38 will count twelve eight bit words and then provide another pulse to the LOAD input of counter 52 reloading the binary equivalent of twenty six into counter 52.

Referring to FIGS. 1, 2, 8 and 9, the following table illustrates the operation of the AND OR gate selector circuit of word decoder circuit 90. The AND OR gate selector circuit of word decoder circuit 90 comprises AND gates 270, 272, 274, 276, 278, 280, 282 and 290 and OR gates 284, 286, 288 and 292.

TABLE I

| W[2..0] | INPUT | OUTPUT (D7 ..A[6..0]) |
|---|---|---|
| 0,0,0 | D[7..0] | D7, 0, 0, 0, 0, 0, 0, 0 |
| 0,0,1 | D[7..0] | D7,D6, 0, 0, 0, 0, 0, 0 |
| 0,1,0 | D[7..0] | D7,D6,D5, 0, 0, 0, 0, 0 |
| 0,1,1 | D[7..0] | D7,D6,D5,D4, 0, 0, 0, 0 |
| 1,0,0 | D[7..0] | D7,D6,D5,D4,D3, 0, 0, 0 |
| 1,0,1 | D[7..0] | D7,D6,D5,D4,D3,D2, 0, 0 |
| 1,1,0 | D[7..0] | D7,D6,D5,D4,D3,D2,D1, 0 |
| 1,1,1 | D[7..0] | D7,D6,D5,D4,D3,D2,D1,D0 |

The word width is supplied by latch 82 to the W[2 . . 0] input of word decoder circuit 90. The three bit gain signal is supplied by latch 68 to the S[2 . . 0] input of word decoder circuit 90. The three gain bits are latched into latch 68 by an enable signal (illustrated in FIG.12F) prior to the beginning of a cluster of encoded doppler data and then supplied to word decoder circuit 90. The encoded doppler data is provided to the D[7 . . 0] input of circuit 90.

For the example illustrated in FIG. 14, the word width is four which is 0,1,1. Referring to TABLE I bits D6, D5, D4 of the first four bit encoded doppler word of the cluster of FIG. 14 respectively pass through AND gates 270, 272 and 274 to eight bit latch 294 while bit D7 of the first four bit encoded doppler word is provided directly to latch 294. AND gates 276, 278, 280 and 282 are inhibited masking out bits D3, D2, D1 and D0.

The next four bit encoded doppler word to be processed by word decoder circuit 90 comprises bits D3, D2, D1 and D0 (encoded doppler word two of the cluster of FIG. 14) which are shifted by serial to parallel shift register 30 to become bits D7, D6 D5 and D4. The second encoded doppler word of the cluster of FIG. 14 is next supplied to latch 294 with bit D7 being supplied directly to latch 294 and bits D6, D5 and D4 being supplied respectively through AND gates 270, 272 and 274 to latch 294.

Similarly, when the word width is 1,1,1, AND gates 270, 272, 274, 276, 278, 280 and 282 are enabled allowing bits D6, D5, D4, D3, D2, D1 and DO to pass through these AND gates to latch 294, while bit D7 is provided directly to latch 294.

The clock signal supplied to Latch 294 is the signal of FIG. 12A, while the enable signal supplied to latch 294 is the logic one pulse occurring at the CY_OUT output of counter 84 which is a logic one at the end of the word width count for each word of a cluster of encoded doppler data words.

TABLE II

| S[2.0] | INPUT | OUTPUTS | | | | | | | | | | | | |
|---|---|---|---|---|---|---|---|---|---|---|---|---|---|---|
| | | Q13 | Q12 | Q11 | Q10 | Q9 | Q8 | Q7 | Q6 | Q5 | Q4 | Q3 | Q2 | Q1 | Q0 |
| 000 | D[7.0] | 0, | 0, | 0, | 0, | 0, | 0, | 0, | D7, | D6, | D5, | D4, | D3, | D2, | D1 |

TABLE II-continued

| S[2.0] | INPUT | Q13 | Q12 | Q11 | Q10 | Q9 | Q8 | Q7 | Q6 | Q5 | Q4 | Q3 | Q2 | Q1 | Q0 |
|---|---|---|---|---|---|---|---|---|---|---|---|---|---|---|---|
| 001 | D[7.0] | 0, | 0, | 0, | 0, | 0, | 0, | D7, | D6, | D5, | D4, | D3, | D2, | D1, | D0 |
| 010 | D[7.0] | 0, | 0, | 0, | 0, | 0, | D7, | D6, | D5, | D4, | D3, | D2, | D1, | D0, | 0 |
| 011 | D[7.0] | 0, | 0, | 0, | 0, | D7, | D6, | D5, | D4, | D3, | D2, | D1, | D0, | 0, | 0 |
| 100 | D[7.0] | 0, | 0, | 0, | D7, | D6, | D5, | D4, | D3, | D2, | D1, | D0, | 0, | 0, | 0 |
| 101 | D[7.0] | 0, | 0, | D7, | D6, | D5, | D4, | D3, | D2, | D1, | D0, | 0, | 0, | 0, | 0 |
| 110 | D[7.0] | 0, | D7, | D6, | D5, | D4, | D3, | D2, | D1, | 0, | 0, | 0, | 0, | 0, | 0 |
| 111 | D[7.0] | D7, | D6, | D5, | D4, | D3, | D2, | D1, | D0, | 0, | 0, | 0, | 0, | 0, | 0 |

For the purpose of illustrating the operation of circuit 90 with respect to one of eight data selector circuits 296, 298, 300, 302, 304, 306, 308, 310, 312, 314, 316, 318, 320 and 322 a gain of four, that is binary 1,0,0 is selected. At the beginning of each cluster, the gain is latched into latch 294.

As is best illustrated by TABLE II a gain of four result in zeros for the three most significant bits of the fourteen bit word provided by circuit 90, that is Q13, Q12 and Q11 are zeros. Select circuit 302 provides at its output bit D7, select circuit 304 provides at its output bit D6, select circuit 306 provides at its output bit D5 and select circuit 308 provides bit D4. The remaining select circuits 310, 312, 314, 316, 318, 320 and 322 all provide logic zeros at their outputs since the word width for the example illustrated in FIG. 14 is binary four.

Figure 10:
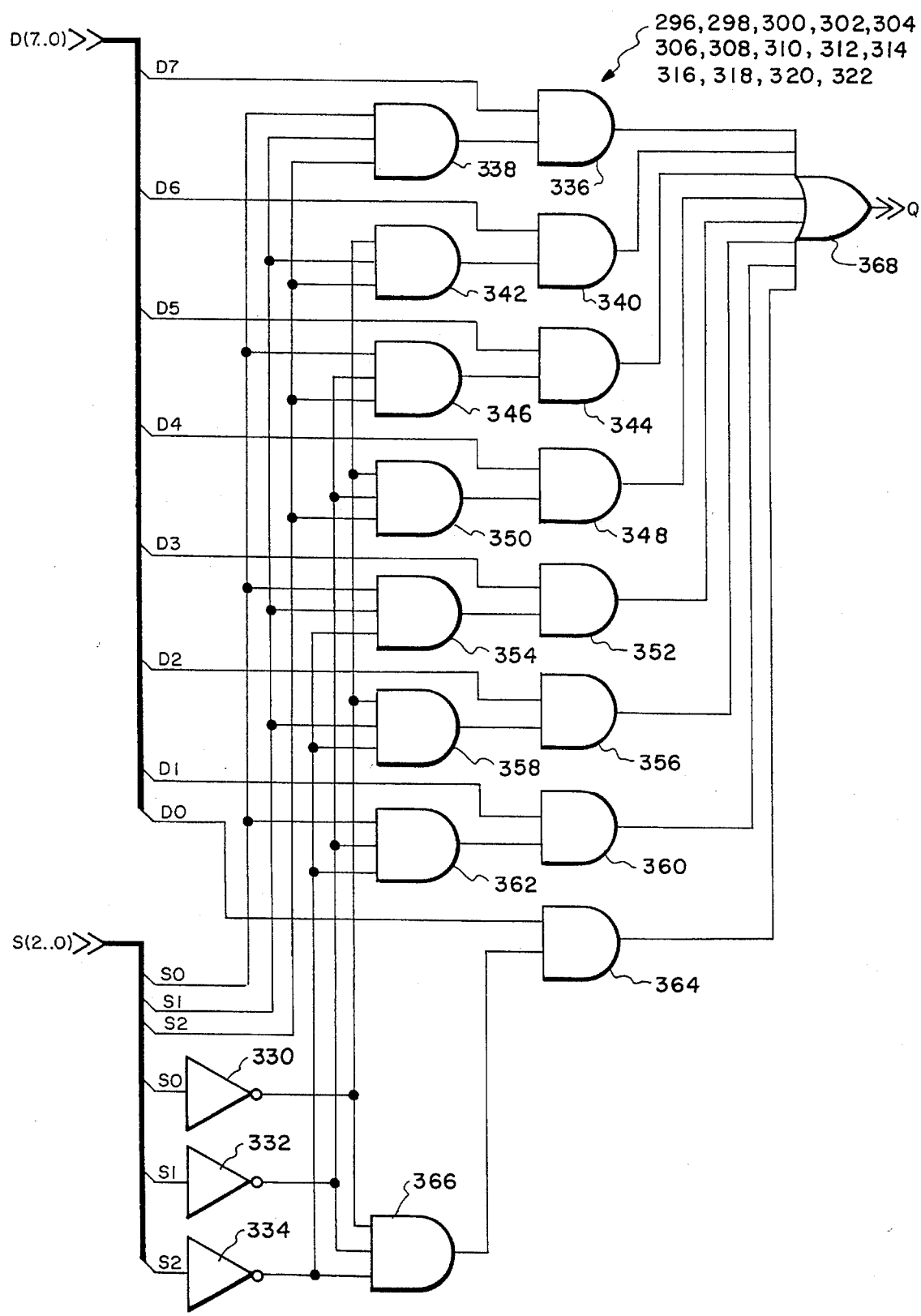
FIG. 10 is a detailed logic diagram of one of the 1 of 8 data selector circuits of FIG. 9.

The transfer function for the one of eight data selector circuit illustrated in FIG. 10 is set forth in the following Table.

TABLE III

| S[2..0] | INPUT | OUTPUT (Q) |
|---|---|---|
| 0,0,0 | D[7..0] | D0 |
| 0,0,1 | D[7..0] | D1 |
| 0,1,0 | D[7..0] | D2 |
| 0,1,1 | D[7..0] | D3 |
| 1,0,0 | D[7..0] | D4 |
| 1,0,1 | D[7..0] | D5 |
| 1,1,0 | D[7..0] | D6 |
| 1,1,1 | D[7..0] | D7 |

Referring to the transfer function of TABLE III, when the gain is four, one of eight data selector circuit 296 will have only AND gate 348 enabled. Since only AND gate has each of its inputs set at the logic one state, a logic one will occur at the output of AND gate 348 which is supplied to the first input of AND gate 348 enabling AND gate 348. Since a logic zero is supplied to the second input of AND gate (as depicted in TABLE II), one of eight data selector circuit 296 will provide at its Q output a logic zero.

In a like manner, for a gain of four only AND gate 348 of one of eight data selector circuit 302 is enabled. Bit D7 which is supplied to AND gain 348 of one of eight data selector circuit 302 will pass through AND gain 348 and OR gate 368 to the Q output of one of eight data selector circuit 302.

When, for example, the gain is set at seven, only the bit supplied to AND gate 336 of each of the data selector circuits 296, 298, 300, 302, 304, 306, 308, 310, 312, 314, 316, 318, 320 and 322 will pass through each data selector circuit 296, 298, 300, 302, 304, 306, 308, 310, 312, 314, 316, 318, 320 and 322 to the D[13 . . 0] output of word decoder circuit 90.

Doppler decoder circuit 21 also provides a logic one pulse at its D_ENABLE output which is illustrated by FIG. 12I. This pulse allows an external circuit to latch therein the fourteen bit data word occurring at the D[13 . . 0] output of doppler decoder circuit 21. The logic one pulse occurring at the output of counter 84 is delayed by two clock pulses of the signal of FIG. 12A by Flip-Flops 92 and 94.

From the foregoing description, it may readily be seen that the present invention comprises a new, unique and exceedingly useful digital circuit for decoding encoded doppler data which constitutes a considerable improvement over the known prior art. Obviously many modifications and variations of the present invention are possible in light of the above teachings. It is, therefore, to be understood that within the scope of appended claims, that the present invention may be practiced otherwise than as specifically described.

What is claimed is:

1. A digital circuit for decoding clusters of encoded doppler data, said digital circuit comprising:

a serial to parallel shift register for receiving said clusters of encoded doppler data, said clusters of encoded doppler data being included in Groups One through N of a plurality of Sub Frames, each of said Groups One through N having n eight bit data words;

said serial to parallel shift register shifting the n eight bit data words of said Groups One through N of each of said plurality of Sub Frames from a serial format to a parallel format;

a comparator circuit coupled to said serial to parallel shift register for a comparing a frame sync signal within each of said plurality of Sub Frames to a reference sync signal, said comparator circuit generating a sync pulse whenever said frame sync signal is identical to said reference sync signal;

a programmed read only memory for providing at least first, second, third and fourth count words, said first count word being representative of the n eight bit words in each of said Groups One through N, said second count word being representative of the Groups N of said eight bit words, said third count word being representative of a location of automatic gain control data and word width data within each of said plurality of Sub Frames and said fourth count word being representative of at least two locations of gain data within each of said Groups One through N;

a first programmed counter coupled to said programmed read only memory and said comparator circuit for receiving said sync pulse and said first count word, said first programmed counter responsive to said sync pulse and said first count word generating a load signal whenever the n eight bit words in each of said Groups One through N is equivalent to said first count word;

a second programmed counter coupled to said first programmed counter, said programmed read only memory and said comparator circuit for receiving said load signal, said second count word and said sync signal, said second programmed counter responsive to said sync pulse, said second count word and said load signal generating a first enable signal whenever the Groups N of said eight bit words is equivalent to said second count word;

said comparator circuit receiving said first enable signal to enable said comparator circuit allowing said comparator to generate said sync pulse;

a third programmed counter coupled to said programmed read only memory and said comparator circuit for receiving said third count word and said sync signal, said third programmed counter responsive to said sync pulse and said third count word generating a second enable signal whenever said third programmed counter has a count equivalent to the location of said automatic gain control data and said word width data within each of said plurality of Sub Frames a first latch coupled to said serial to parallel shift register and said third programmed counter for receiving the n eight bit data words of said Groups One through N of each of said plurality of Sub Frames and said second enable signal, said first latch responsive to said second enable signal latching said word width data within each of said plurality of Sub Frames into said first latch;

a second latch coupled to said serial to parallel shift register and said third programmed counter for receiving the n eight bit data words of said Groups One through N of each of said plurality of Sub Frames and said second enable signal, said second latch responsive to said second enable signal latching said automatic gain control data within each of said plurality of Sub Frames into said second latch;

a forth programmed counter coupled to said programmed read only memory and said first programmed counter for receiving said fourth count word and said load signal, said forth programmed counter responsive to said fourth count word and said load signal generating a third enable signal whenever said fourth programmed counter has a count equivalent to the at least two locations of said gain data within each of said Groups One through N;

a third latch coupled to said serial to parallel shift register and said fourth programmed counter for receiving the n eight bit data words of said Groups One through N of each of said plurality of Sub Frames and said third enable signal, said third latch responsive to said third enable signal latching the at least two locations of said gain data within each of said Groups One through N into said third latch;

a fifth programmed counter coupled to said first latch and said fourth programmed counter for receiving said third enable signal and said word width data;

a sixth programmed counter coupled to said fifth programmed counter, said second latch and said forth programmed counter for receiving said third enable signal and said automatic gain control data;

said fifth and sixth programmed counters, responsive to said third enable signal, said word width data and said automatic gain control data generating a fourth enable signal; and a word decoder circuit coupled to said serial to parallel shift register, said first latch, said third latch and said fifth programmed counter for receiving the n eight bit data words of said Groups One through N of each of said plurality of Sub Frames, said word width data, said gain data and said fourth enable signal, said word decoder circuit responsive to said word width data, said gain data and said fourth enable signal extracting said clusters of encoded doppler data from each Groups One through N of each of said plurality of Sub Frames;

said word decoder circuit providing a plurality of doppler data words representative of said clusters of encoded doppler data extracted from each Groups One through N of each of said plurality of Sub Frames.

2. The digital circuit of claim 1 wherein said serial to parallel shift register comprises a twenty four bit serial to parallel shift register.

3. The digital circuit of claim 1 wherein said frame sync signal and said reference sync signal each comprises twenty four digital bits.

4. The digital circuit of claim 1 wherein said comparator circuit comprises:

twenty four EXCLUSIVE-NOR gates, each of said twenty four EXCLUSIVE-NOR gates having a first input for receiving a digital bit of said frame sync signal, a second input for receiving a digital bit of said reference sync signal and an output;

a first AND gate coupled to the outputs of twelve of said twenty four EXCLUSIVE-NOR gates, said first AND gate having an output;

a second AND gate coupled to a remaining twelve of said twenty four EXCLUSIVE-NOR gates, said second AND gate having an output;

a first Flip-Flop having a data input connected to the output of said first AND gate, a clock input for receiving an external clock signal and a Q output;

a second Flip-Flop having a data input connected to the output of said second AND gate, a clock input for receiving said external clock signal and a Q output;

a third AND gate having a first input connected to the Q output of said first Flip-Flop, a second input connected to the Q output of said second Flip-Flop, a third input for receiving said first enable signal from said second programmed counter and an output; and a third Flip-Flop having a data input connected to the output of said third AND gate, a clock input for receiving said external clock signal and a Q output for providing said sync pulse.

5. The digital circuit of claim 1 wherein said first, second, third and fourth programmed counters each comprise a programmed ten bit counter.

6. The digital circuit of claim 1 wherein said fifth and sixth programmed counters each comprise a programmed three bit counter.

7. The digital circuit of claim 1 wherein said first, second and third latches each comprise a three bit latch.

8. The digital circuit of claim 1 wherein said word decoder circuit comprises;

a first AND gate (290) having a first input connected to said first latch, a second input connected to said first latch and an output;

a first OR gate (288) having a first input connected to said first latch, a second input connected to said first latch and an output;

a second OR gate (286) having a first input connected to said first latch, a second input connected to said first latch and an output;

a third OR gate (284) having a first input connected to said first latch, a second input connected to said first latch, a third input connected to said first latch and an output;

a fourth OR gate (292) having a first input connected to the output of said first AND gate (290), a second input connected to said first latch and an output;

a second AND gate (282) having a first input connect to said serial to parallel shift register, a second input connected to said first latch, a third input connected to said first latch, a fourth input connected to said first latch and an output;

a third AND gate (280) having a first input connect to said serial to parallel shift register, a second input connected to said first latch, a third input connected to said first latch and an output;

a fourth AND gate (278) having a first input connected to said serial to parallel shift register, a second input connected to said first latch, a third input connected to the output of said first OR gate (288) and an output;

a fifth AND gate (276) having a first input connected to said serial to parallel shift register, a second input connected to said first latch and an output;

a sixth AND gate (274) having a first input connected to said serial to parallel shift register, a second input connected to the output of said fourth OR gate (292) and an output;

a seventh AND gate (272) having a first input connected to said serial to parallel shift register, a second input connected to the output of said second OR gate (286) and an output;

an eighth AND gate (270) having a first input connected to said serial to parallel shift register, a second input connected to the output of said third OR gate (284) and an output;

an eight bit latch having data input connected to said serial to parallel shift register, a second data input connected to the output of said eighth AND gate (270), a third data input connected to the output of said seventh AND gate (272), a fourth data input connected to the output of said sixth AND gate (274), a fifth data input connected to the output of said fifth AND gate (276), a sixth data input connected to the output of said fourth AND gate (278), a seventh data input connected to the output of said third AND gate (280), an eighth data input connected to the output of second AND gate (282) and an output, a clock input for receiving an external clock signal, an enable input for receiving said fourth enable signal and an data outputs; and fourteen one of eight data selector circuits, each of said one of eight data selector circuits having eight data inputs connected to the eight data outputs of said eight bit latch, three gain inputs connected to said latch and an output for providing one data bit of each of said plurality of doppler data words.

9. The digital circuit of claim 8 wherein each of said fourteen one of eight data selector circuits comprises:

a first inverter (330) having an input connected to said third latch and an output;

a second inverter (332) having an input connected to said third latch and an output;

a third inverter (334) having an input connected to said third latch and an output;

a first AND gate (366) having a first input connected to the output of said first inverter (330), a second input connected to the output of said second inverter (332), a third input connected to the output of said third inverter (334) and an output;

a second AND gate (364) having a first input connected to the output of said first AND gate (366), a second input connected to the output of said eight bit latch and an output;

a third AND gate (362) having a first input connected to said third latch, a second input connected to the output of said second inverter (332), a third input connected to the output of said third inverter (334) and an output;

a fourth AND gate (358) having a first input connected to said third latch, a second input connected to the output of said first inverter (330), a third input connected to the output of said third inverter (334) and an output;

a fifth AND gate (354) having a first input connected to said third latch, a second input connected to said third latch, a third input connected to the output of said third inverter (334) and an output;

a sixth AND gate (350) having a first input connected to said third latch, a second input connected to the output of said first inverter (330), a third input connected to the output of said second inverter (332) and an output;

a seventh AND gate (346) having a first input connected to said third latch, a second input connected to said third latch, a third input connected to the output of said second inverter (332) and an output;

an eighth AND gate (342) having a first input connected to said third latch, a second input connected to said third latch, a third input connected to the output of said first inverter (330) and an output;

a ninth AND gate (338) having a first input connected to said third latch, a second input connected to said third latch, a third input connected to said third latch and an output;

a tenth AND gate (360) having a first input connected to the output of said third AND gate (362), a second input connected to said eight bit latch and an output;

an eleventh AND gate (356) having a first input connected to the output of said forth AND gate (358), a second input connected to said eight bit latch and an output;

a twelfth AND gate (352) having a first input connected to the output of said fifth AND gate (354), a second input connected to said eight bit latch and an output;

a thirteenth AND gate (348) having a first input connected to the output of said sixth AND gate (350), a second input connected to said eight bit latch and an output;

a fourteenth AND gate (344) having a first input connected to the output of said seventh AND gate (346), a second input connected to said eight bit latch and an output;

a fifteenth AND gate (340) having a first input connected to the output of said eighth AND gate (342), a second input connected to said eight bit latch and an output;

a sixteenth AND gate (336) having a first input connected to the output of said ninth AND gate (338), a second input connected to said eight bit latch and an output; and a first OR gate (368) having a first input connected to the output of said sixteenth AND gate (336), a second input connected to the output of said fifteenth AND gate (340), a third input connected to the output of said fourteenth AND gate (344), a fourth input connected to the output of said thirteenth AND gate (348), a fifth input connected to the output of said twelfth AND gate (352), a sixth input connected to the output of said eleventh AND gate (356), a seventh input connected to the output of said tenth AND gate (360), an eighth input connected to the output of said second AND gate 364 and an output for providing one data bit of each of said plurality of doppler data words.

10. A digital circuit for decoding clusters of encoded doppler data, said digital circuit comprising:

a serial to parallel shift register for receiving said clusters of encoded doppler data, said clusters of encoded doppler data being included in Groups One through N of a plurality of Sub Frames, each of said Groups One through N having n eight bit data words;

said serial to parallel shift register shifting the n eight bit data words of said Groups One through N of each of said plurality of Sub Frames from a serial format to a parallel format;

a comparator circuit coupled to said serial to parallel shift register for a comparing a frame sync signal within each of said plurality of Sub Frames to a reference sync signal, said comparator circuit generating a sync pulse whenever said frame sync signal is identical to said reference sync signal;

a programmed read only memory for providing at least first, second, third and fourth count words, said first count word being representative of the n eight bit words in each of said Groups One through N, said second count word being representative of the Groups N of said eight bit words, said third count word being representative of a location of automatic gain control data and word width data within each of said plurality of Sub Frames and said fourth count word being representative of at least two locations of gain data within each of said Groups One through N;

a first programmed ten bit counter coupled to said programmed read only memory and said comparator circuit for receiving said sync pulse and said first count word, said first programmed ten bit counter responsive to said sync pulse and said first count word generating a load signal whenever the n eight bit words in each of said Groups One through N is equivalent to said first count word;

a second programmed ten bit counter coupled to said first programmed ten bit counter, said programmed read only memory and said comparator circuit for receiving said load signal, said second count word and said sync signal, said second programmed ten bit counter responsive to said sync pulse, said second count word and said load signal generating a first enable signal whenever the Groups N of said eight bit words is equivalent to said second count word;

said comparator circuit receiving said first enable signal to enable said comparator circuit allowing said comparator to generate said sync pulse;

a third programmed ten bit counter coupled to said programmed read only memory and said comparator circuit for receiving said third count word and said sync signal, said third programmed ten bit counter responsive to said sync pulse and said third count word generating a second enable signal whenever said third programmed ten bit counter has a count equivalent to the location of said automatic gain control data and said word width data within each of said plurality of Sub Frames a clock enable pulse circuit coupled to said third programmed ten bit counter for receiving said second enable signal, said clock enable pulse circuit responsive to said second enable signal generating a one clock cycle pulse;

a first three bit latch coupled to said serial to parallel shift register and said clock enable pulse circuit for receiving the n eight bit data words of said Groups One through N of each of said plurality of Sub Frames and said one clock cycle pulse, said first three bit latch responsive to said one clock cycle pulse latching said word width data within each of said plurality of Sub Frames into said first three bit latch;

a second three bit latch coupled to said serial to parallel shift register and said clock enable pulse circuit for receiving the n eight bit data words of said Groups One through N of each of said plurality of Sub Frames and said one clock cycle pulse, said second three bit latch responsive to said one clock cycle pulse latching said automatic gain control data within each of said plurality of Sub Frames into said second three bit latch;

a forth programmed ten bit counter coupled to said programmed read only memory and said first programmed ten bit counter for receiving said fourth count word and said load signal, said forth programmed ten bit counter responsive to said fourth count word and said load signal generating a third enable signal whenever said fourth programmed ten bit counter has a count equivalent to the at least two locations of said gain data within each of said Groups One through N;

a third three bit latch coupled to said serial to parallel shift register and said fourth programmed ten bit counter for receiving the n eight bit data words of said Groups One through N of each of said plurality of Sub Frames and said third enable signal, said third three bit latch responsive to said third enable signal latching the at least two locations of said gain data within each of said Groups One through N into said third three bit latch;

a three bit delay circuit coupled to said fourth ten bit programmed counter for receiving said third enable signal and an external clock signal, said three bit delay circuit responsive to said third delay signal and said external clock signal generating a fourth enable signal having a three clock pulse delay;

a first programmed three bit counter coupled to said first three bit latch and said three bit delay circuit for receiving said fourth enable signal and said word width data;

a second programmed three bit counter coupled to said first programmed three bit counter, said second three bit latch and said three bit delay circuit for receiving said fourth enable signal and said automatic gain control data;

said first and second programmed three bit counters, responsive to said fourth enable signal, said word width data and said automatic gain control data generating a fifth enable signal; and a word decoder circuit coupled to said serial to parallel shift register, said first three bit latch, said third three bit latch and said first programmed three bit counter for receiving the n eight bit data words of said Groups One through N of each of said plurality of Sub Frames, said word width data, said gain data and said fifth enable signal, said word decoder circuit responsive to said word width data, said gain data and said fifth enable signal extracting said clusters of encoded doppler data from each Groups One through N of each of said plurality of Sub Frames;

said word decoder circuit providing a plurality of doppler data words representative of said clusters of encoded doppler data extracted from each Groups One through N of each of said plurality of Sub Frames.

11. The digital circuit of claim 10 wherein said serial to parallel shift register comprises a twenty four bit serial to parallel shift register.

12. The digital circuit of claim 10 wherein said frame sync signal and said reference sync signal each comprises twenty four digital bits.

13. The digital circuit of claim 10 wherein said comparator circuit comprises:

twenty four EXCLUSIVE-NOR gates, each of said twenty four EXCLUSIVE-NOR gates having a first input for receiving a digital bit of said frame sync signal, a second input for receiving a digital bit of said reference sync signal and an output;

a first AND gate coupled to the outputs of twelve of said twenty four EXCLUSIVE-NOR gates, said first AND gate having an output;

a second AND gate coupled to a remaining twelve of said twenty four EXCLUSIVE-NOR gates, said second AND gate having an output;

a first Flip-Flop having a data input connected to the output of said first AND gate, a clock input for receiving said external clock signal and a Q output;

a second Flip-Flop having a data input connected to the output of said second AND gate, a clock input for receiving said external clock signal and a Q output;

a third AND gate having a first input connected to the Q output of said first Flip-Flop, a second input connected to the Q output of said second Flip-Flop, a third input for receiving said first enable signal from said second programmed counter and an output; and a third Flip-Flop having a data input connected to the output of said third AND gate, a clock input for receiving said external clock signal and a Q output for providing said sync pulse.

14. The digital circuit of claim 10 wherein said clock enable pulse circuit comprises:

a Flip-Flop having a data input connected to a ground, a clock input for receiving said external clock signal, a preset input for receiving said second enable signal and an output; and an AND gate having a first input for receiving said second enable signal, a second input connected to the output of said Flip-Flop and an output for providing said one clock cycle pulse.

15. The digital circuit of claim 10 wherein said three bit delay circuit comprises a first Flip-Flop having a clock input for receiving said external clock signal, a data input connected to a logic one signal, a clear input and an output;

a second Flip-Flop having a clock input for receiving said external clock signal, a data input connected to the output of said first Flip-Flop, a clear input and an output;

a third Flip-Flop having a clock input for receiving said external clock signal, a data input connected to the output of said second Flip-Flop, a clear input and an output connected to said first and second programmed three bit counters;

an AND gate having a first input connected to the output of said forth programmed ten bit counter, a second input and an output connected to the clear inputs of said first, second and third Flip-Flops; and an inverter having an input connected to said second programmed three bit counter and an output connected to the second input of said AND gate.

16. The digital circuit of claim 10 wherein said word decoder circuit comprises;

a first AND gate (290) having a first input connected to said first latch, a second input connected to said first latch and an output;

a first OR gate (288) having a first input connected to said first latch, a second input connected to said first latch and an output;

a second OR gate (286) having a first input connected to said first latch, a second input connected to said first latch and an output;

a third OR gate (284) having a first input connected to said first latch, a second input connected to said first latch, a third input connected to said first latch and an output;

a fourth OR gate (292) having a first input connected to the output of said first AND gate (290), a second input connected to said first latch and an output;

a second AND gate (282) having a first input connect to said serial to parallel shift register, a second input connected to said first latch, a third input connected to said first latch, a fourth input connected to said first latch and an output;

a third AND gate (280) having a first input connect to said serial to parallel shift register, a second input connected to said first latch, a third input connected to said first latch and an output;

a fourth AND gate (278) having a first input connected to said serial to parallel shift register, a second input connected to said first latch, a third input connected to the output of said first OR gate (288) and an output;

a fifth AND gate (276) having a first input connected to said serial to parallel shift register, a second input connected to said first latch and an output;

a sixth AND gate (274) having a first input connected to said serial to parallel shift register, a second input connected to the output of said fourth OR gate (292) and an output;

a seventh AND gate (272) having a first input connected to said serial to parallel shift register, a second input connected to the output of said second OR gate (286) and an output;

an eighth AND gate (270) having a first input connected to said serial to parallel shift register, a second input connected to the output of said third OR gate (284) and an output;

an eight bit latch having data input connected to said serial to parallel shift register, a second data input connected to the output of said eighth AND gate (270), a third data input connected to the output of said seventh AND gate (272), a fourth data input connected to the output of said sixth AND gate (274), a fifth data input connected to the output of said fifth AND gate (276), a sixth data input connected to the output of said fourth AND gate (278), a seventh data input connected to the output of said third AND gate (280), an eighth data input connected to the output of second AND gate (282) and an output, a clock input for receiving said external clock signal, an enable input for receiving said fourth enable signal and an data outputs; and fourteen one of eight data selector circuits, each of said one of eight data selector circuits having eight data inputs connected to the eight data outputs of said eight bit latch, three gain inputs connected to said latch and an output for providing one data bit of each of said plurality of doppler data words.

17. The digital circuit of claim 16 wherein each of said fourteen one of eight data selector circuits comprises:

a first inverter (330) having an input connected to said third latch and an output;

a second inverter (332) having an input connected to said third latch and an output;

a third inverter (334) having an input connected to said third latch and an output;

a first AND gate (366) having a first input connected to the output of said first inverter (330), a second input connected to the output of said second inverter (332), a third input connected to the output of said third inverter (334) and an output;

a second AND gate (364) having a first input connected to the output of said first AND gate (366), a second input connected to the output of said eight bit latch and an output;

a third AND gate (362) having a first input connected to said third latch, a second input connected to the output of said second inverter (332), a third input connected to the output of said third inverter (334) and an output;

a fourth AND gate (358) having a first input connected to said third latch, a second input connected to the output of said first inverter (330), a third input connected to the output of said third inverter (334) and an output;

a fifth AND gate (354) having a first input connected to said third latch, a second input connected to said third latch, a third input connected to the output of said third inverter (334) and an output;

a sixth AND gate (350) having a first input connected to said third latch, a second input connected to the output of said first inverter (330), a third input connected to the output of said second inverter (332) and an output;

a seventh AND gate (346) having a first input connected to said third latch, a second input connected to said third latch, a third input connected to the output of said second inverter (332) and an output;

an eighth AND gate (342) having a first input connected to said third latch, a second input connected to said third latch, a third input connected to the output of said first inverter (330) and an output;

a ninth AND gate (338) having a first input connected to said third latch, a second input connected to said third latch, a third input connected to said third latch and an output;

a tenth AND gate (360) having a first input connected to the output of said third AND gate (362), a second input connected to said eight bit latch and an output;

an eleventh AND gate (356) having a first input connected to the output of said forth AND gate (358), a second input connected to said eight bit latch and an output;

a twelfth AND gate (352) having a first input connected to the output of said fifth AND gate (354), a second input connected to said eight bit latch and an output;

a thirteenth AND gate (348) having a first input connected to the output of said sixth AND gate (350), a second input connected to said eight bit latch and an output;

a fourteenth AND gate (344) having a first input connected to the output of said seventh AND gate (346), a second input connected to said eight bit latch and an output;

a fifteenth AND gate (340) having a first input connected to the output of said eighth AND gate (342), a second input connected to said eight bit latch and an output;

a sixteenth AND gate (336) having a first input connected to the output of said ninth AND gate (338), a second input connected to said eight bit latch and an output; and a first OR gate (368) having a first input connected to the output of said sixteenth AND gate (336), a second input connected to the output of said fifteenth AND gate (340), a third input connected to the output of said fourteenth AND gate (344), a fourth input connected to the output of said thirteenth AND gate (348), a fifth input connected to the output of said twelfth AND gate (352), a sixth input connected to the output of said eleventh AND gate (356), a seventh input connected to the output of said tenth AND gate (360), an eighth input connected to the output of said second AND gate 364 and an output for providing one data bit of each of said plurality of doppler data words.

* * * * *